US012089205B2

United States Patent
Kim et al.

(10) Patent No.: US 12,089,205 B2
(45) Date of Patent: Sep. 10, 2024

(54) METHOD FOR TRANSMITTING OR RECEIVING DATA CHANNEL IN WIRELESS COMMUNICATION SYSTEM, AND APPARATUS THEREFOR

(71) Applicant: LG ELECTRONICS INC., Seoul (KR)

(72) Inventors: Hyungtae Kim, Seoul (KR); Jiwon Kang, Seoul (KR)

(73) Assignee: LG Electronics Inc., Seoul (KR)

(*) Notice: Subject to any disclaimer, the term of this patent is extended or adjusted under 35 U.S.C. 154(b) by 368 days.

(21) Appl. No.: 17/608,033

(22) PCT Filed: Apr. 29, 2020

(86) PCT No.: PCT/KR2020/005747
§ 371 (c)(1),
(2) Date: Nov. 1, 2021

(87) PCT Pub. No.: WO2020/222556
PCT Pub. Date: Nov. 5, 2020

(65) Prior Publication Data
US 2022/0217742 A1    Jul. 7, 2022

(30) Foreign Application Priority Data

May 1, 2019 (KR) .................. 10-2019-0051175

(51) Int. Cl.
*H04W 4/00* (2018.01)
*H04L 5/00* (2006.01)
(Continued)

(52) U.S. Cl.
CPC ....... *H04W 72/1263* (2013.01); *H04L 5/0016* (2013.01); *H04L 5/0051* (2013.01); *H04W 72/0446* (2013.01); *H04W 72/23* (2023.01)

(58) Field of Classification Search
None
See application file for complete search history.

(56) References Cited

U.S. PATENT DOCUMENTS

| 2016/0182208 A1 | 6/2016 | Yi et al. |
| 2019/0222284 A1* | 7/2019 | Huang .................. H04W 72/23 |
| 2019/0253220 A1* | 8/2019 | Kim .................... H04W 72/046 |

FOREIGN PATENT DOCUMENTS

KR    20170128206    11/2017

OTHER PUBLICATIONS

Extended European Search Report in European Application No. 20798602.7, dated May 9, 2022, 10 pages.

(Continued)

*Primary Examiner* — Zewdu A Beyen
(74) *Attorney, Agent, or Firm* — Fish & Richardson P.C.

(57) ABSTRACT

The present disclosure provides a method for transmitting or receiving a data channel in a wireless communication system, and an apparatus therefor. Specifically, a method for receiving a data channel by a user equipment (UE) in a wireless communication system may include: receiving downlink control information (DCI), wherein the DCI includes i) a transmission configuration indication (TCI) field and ii) an antenna port field; and receiving the data channel based on the DCI, wherein multiple TCI states are indicated on the basis of the TCI field, a demodulation reference signal (DM-RS) port is indicated on the basis of the antenna port field, and a repetition scheme of the data channel is determined on the basis of the number of code division multiplexing (CDM) groups including a DM-RS port in which the data channel is received.

12 Claims, 14 Drawing Sheets

(51) Int. Cl.
*H04W 72/0446* (2023.01)
*H04W 72/1263* (2023.01)
*H04W 72/23* (2023.01)

(56) References Cited

OTHER PUBLICATIONS

Huawei et al., "Summary of AI: 7.2.8.2 Enhancements on Multi-TRP/Panel Transmission of Offline Discussion," 3GPP TSG RAN WG1 Meeting #96, R1-190abcd, Athens, Greece, Feb. 25-Mar. 1, 2019, 59 pages.
NTT DOCOMO, Inc., "Enhancements on multi-TRP/panel transmission," 3GPP TSG RAN WG1 #96bis, R1-1904966, Xi'an, China, Apr. 8-12, 2019, 29 pages.
CATT, "Consideration on multi-TRP/panel transmission," R1-1904561, Presented at 3GPP TSG RAN WG1 #96bis, Xi'an, China, Apr. 8-12, 2019, 14 pages.
International Search Report in International Appln. No. PCT/KR2020/005747, dated Aug. 28, 2020, 5 pages (with English translation).
Vivo, "Further Discussion on Multi-TRP Transmission," R1-1905817, 3GPP TSG RAN WG1 #96bis, Xi'an, China, Apr. 8-12, 2019, 14 pages.
ZTE, "Enhancements on Multi-TRP and Multi-panel Transmission," R1-1904013, Presented at 3GPP TSG RAN WG1 #96bis, Xi'an, China, Apr. 8-12, 2019, 13 pages.

\* cited by examiner

【FIG. 1】
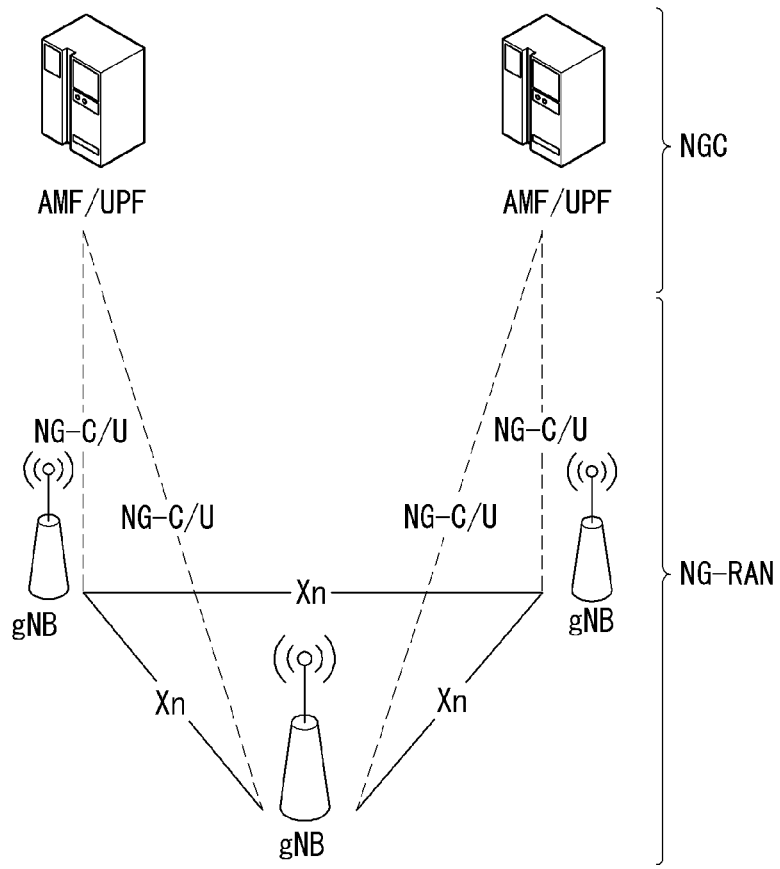
【FIG. 2】
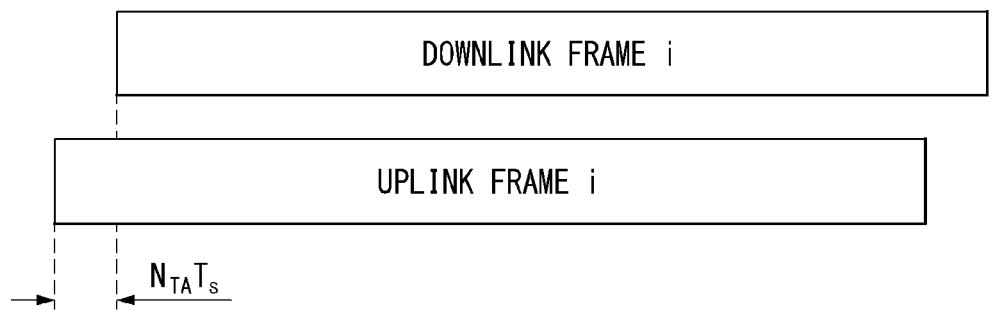

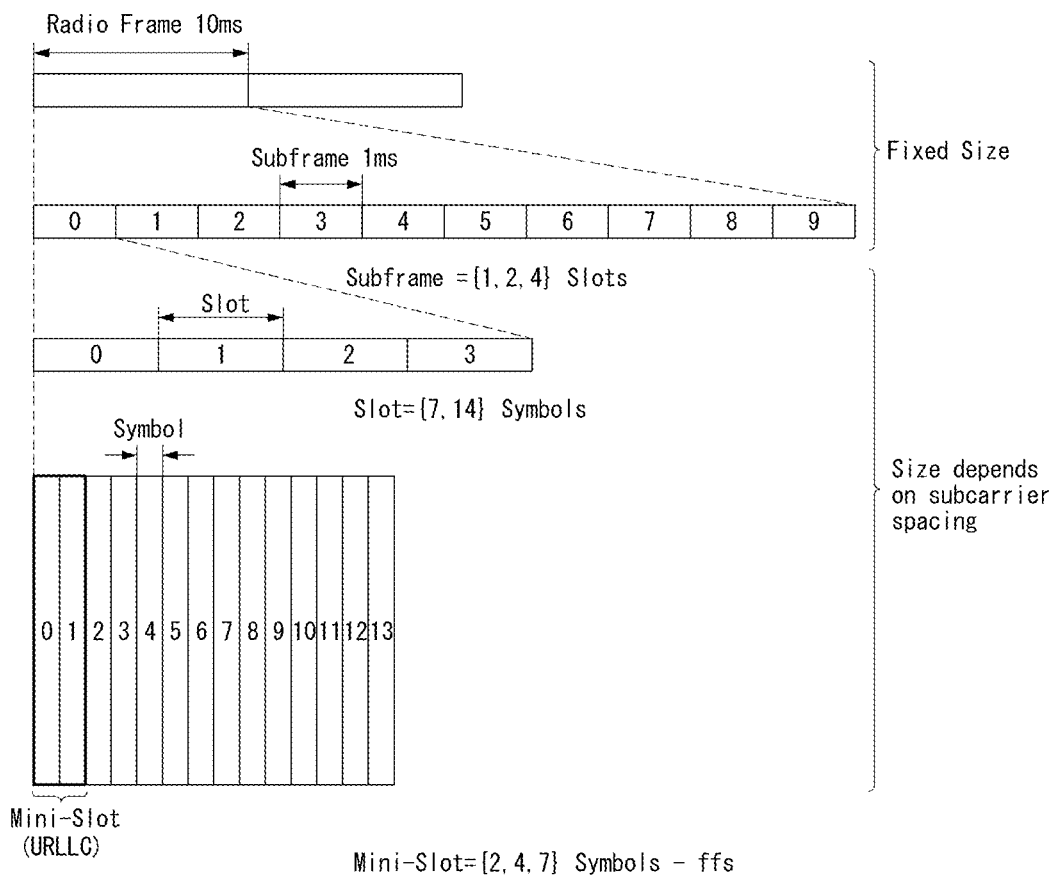

[FIG. 4]
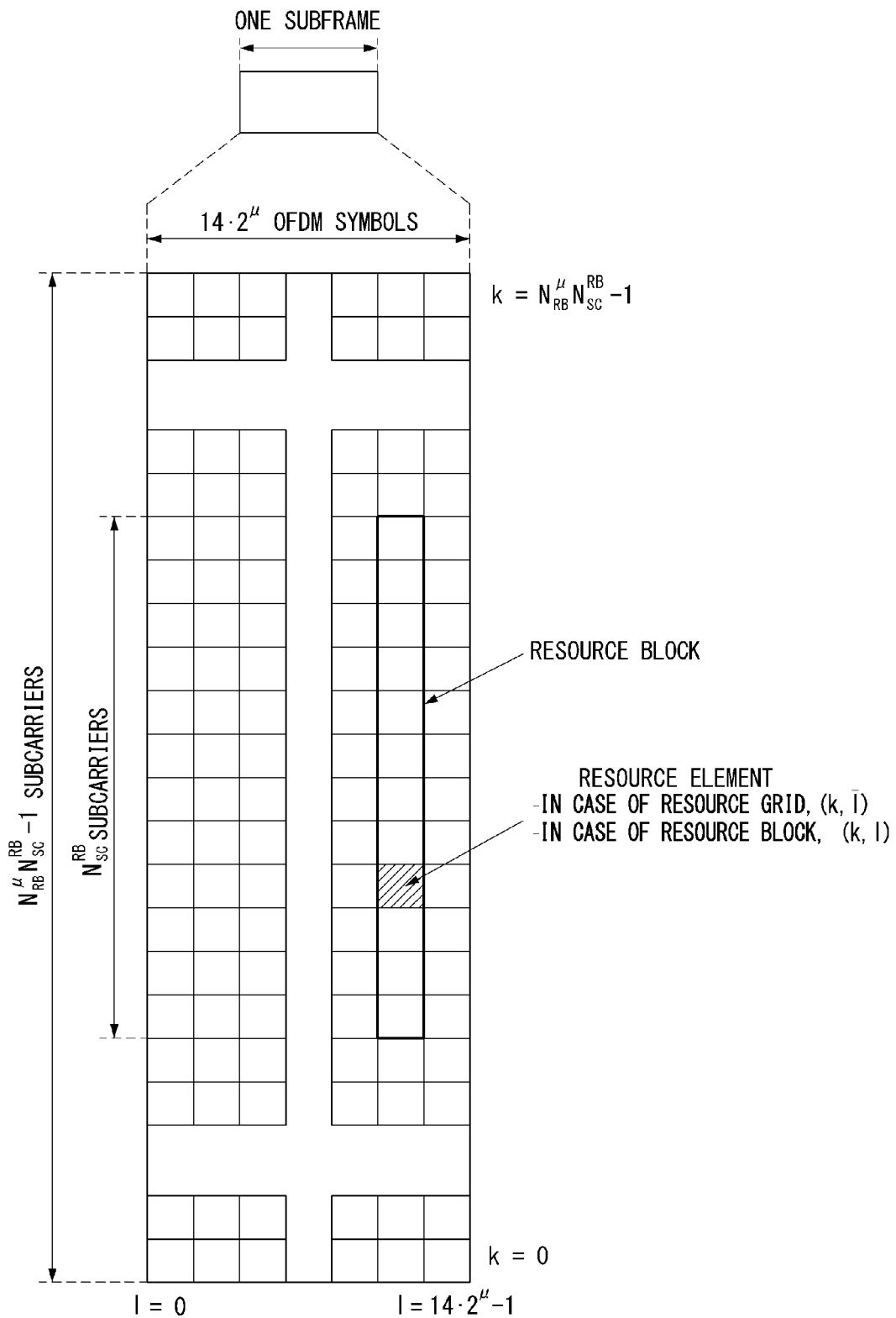

[FIG. 5]
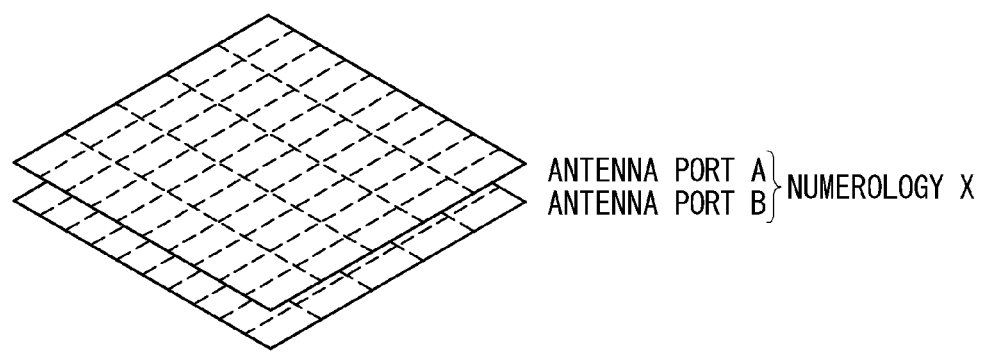
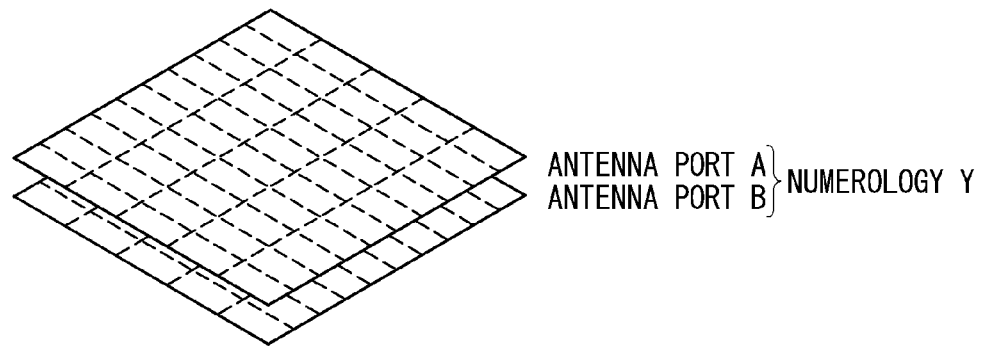

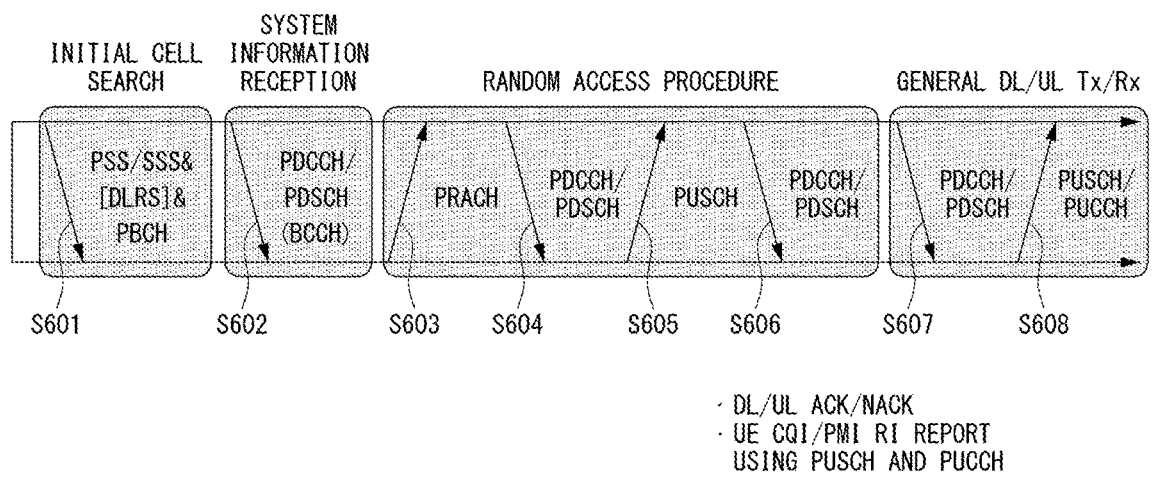
[FIG. 6]

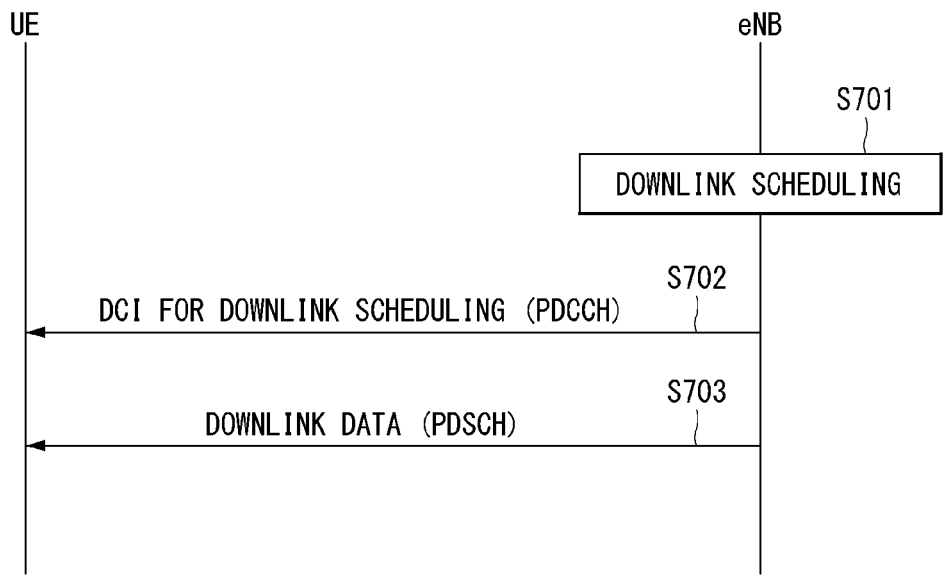
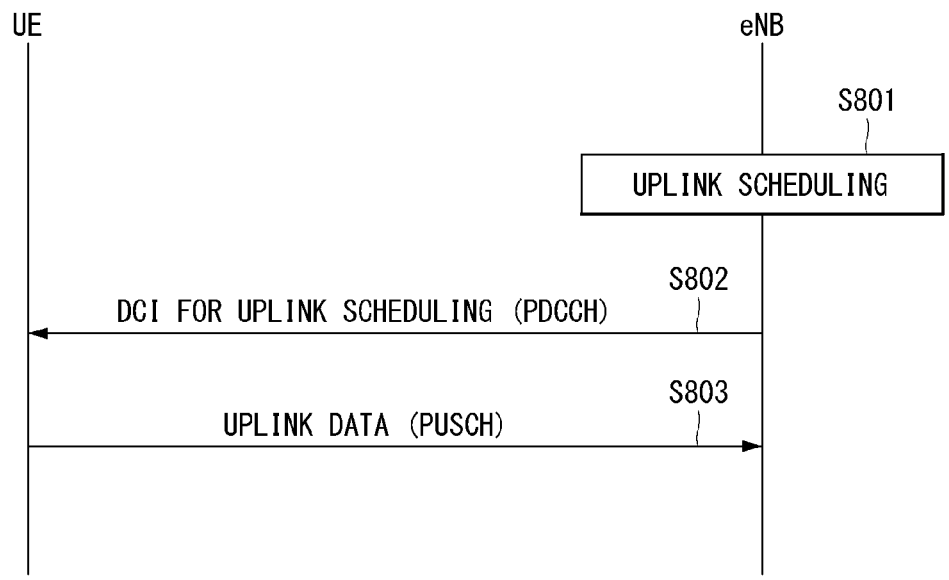

[FIG. 9]
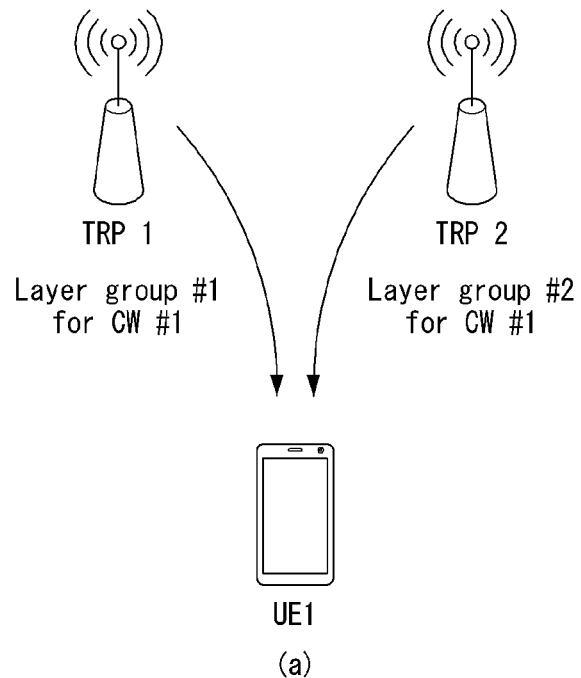
(a)
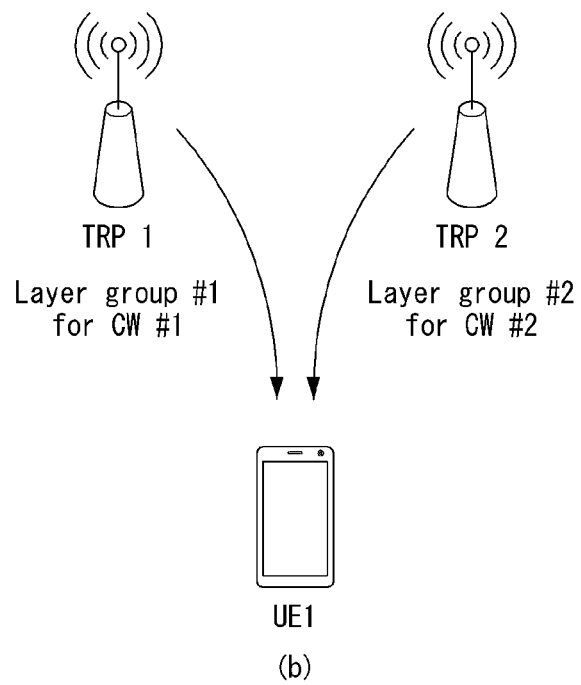
(b)

[FIG. 10]
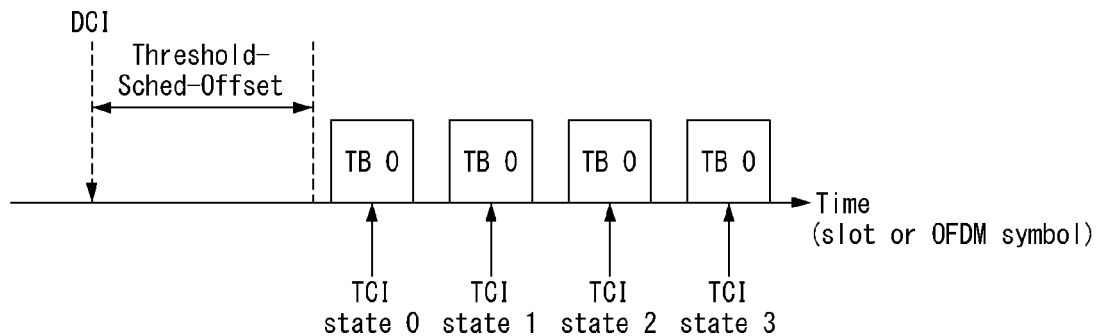
[FIG. 11]
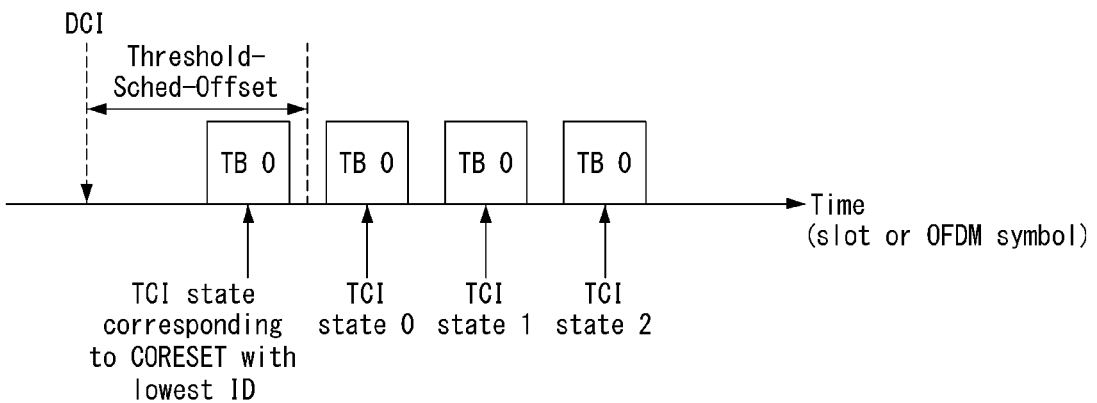
[FIG. 12]
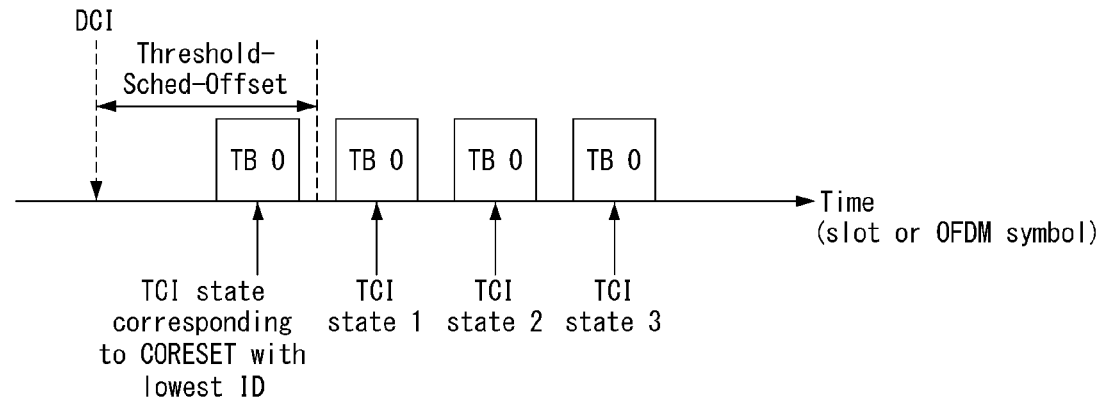

[FIG. 13]
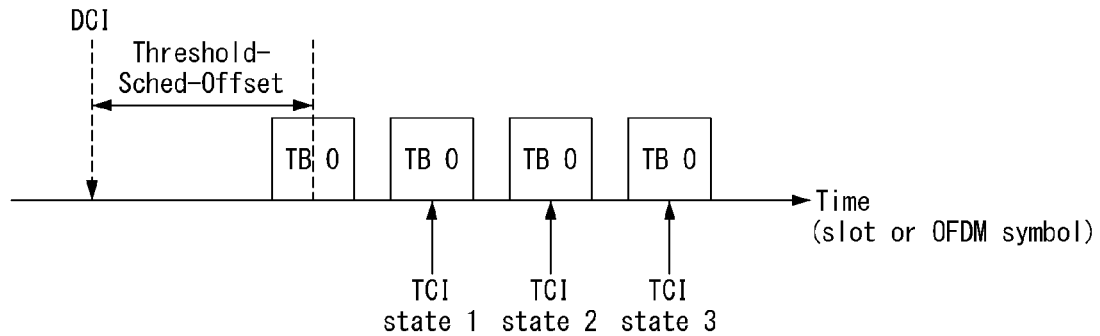
[FIG. 14]
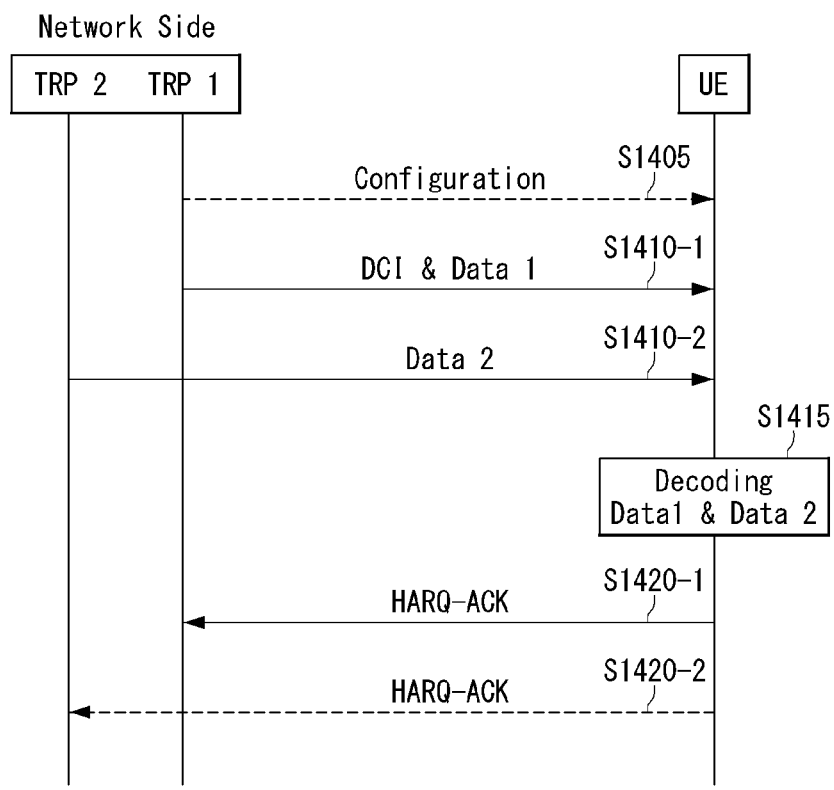

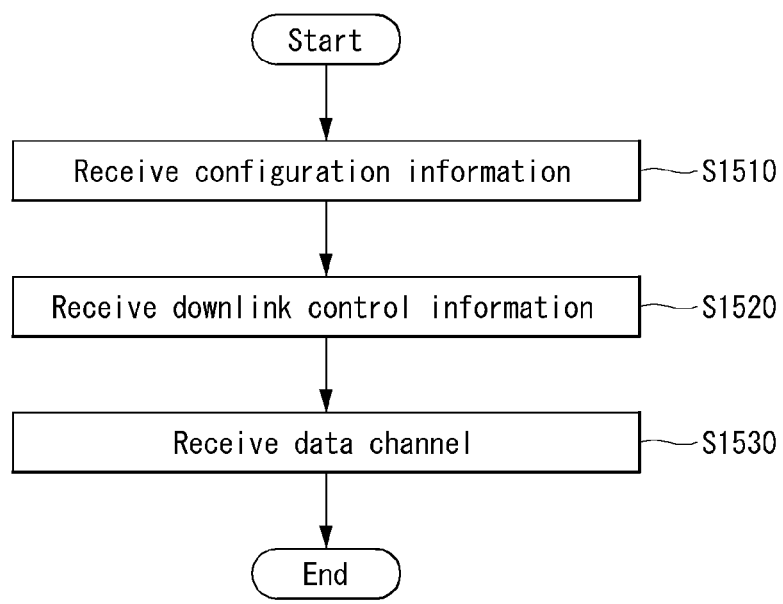
[FIG. 15]

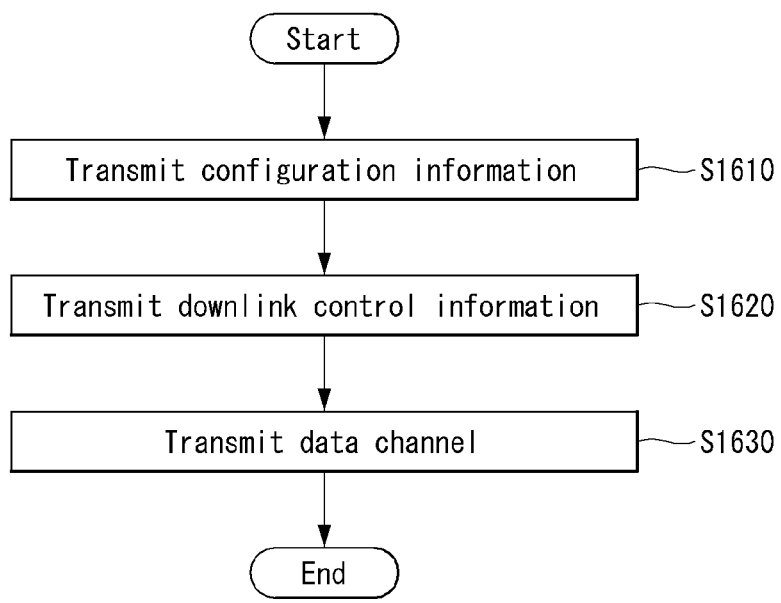

[FIG. 17]
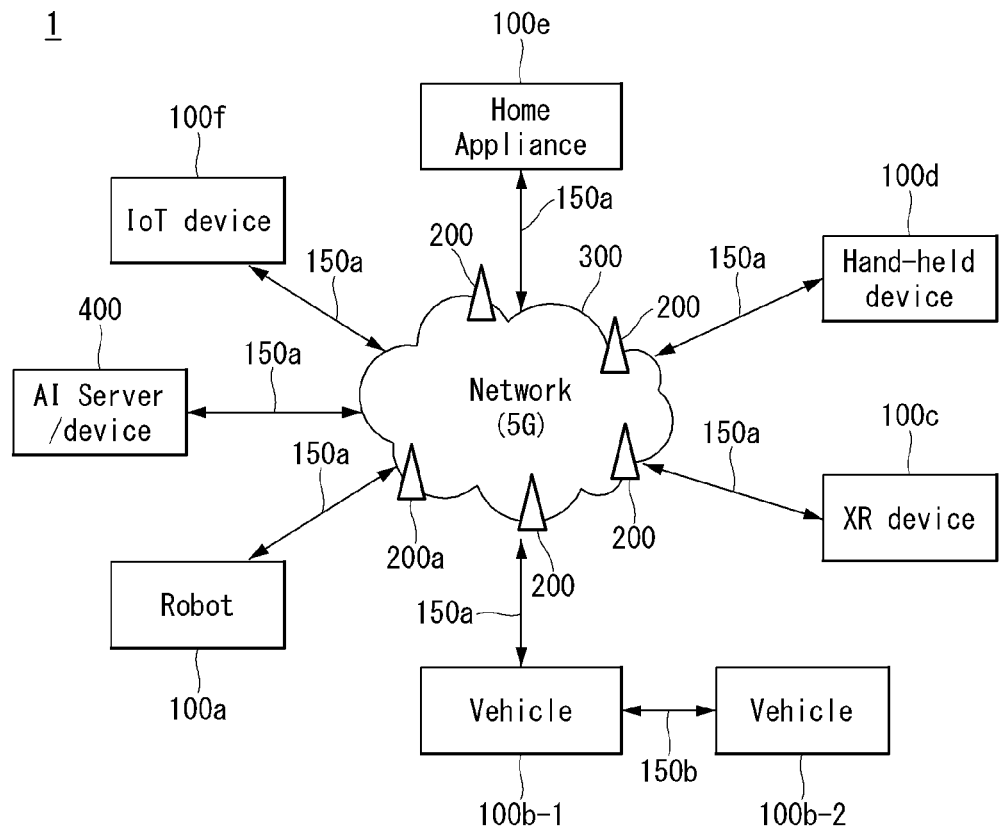
[FIG. 18]
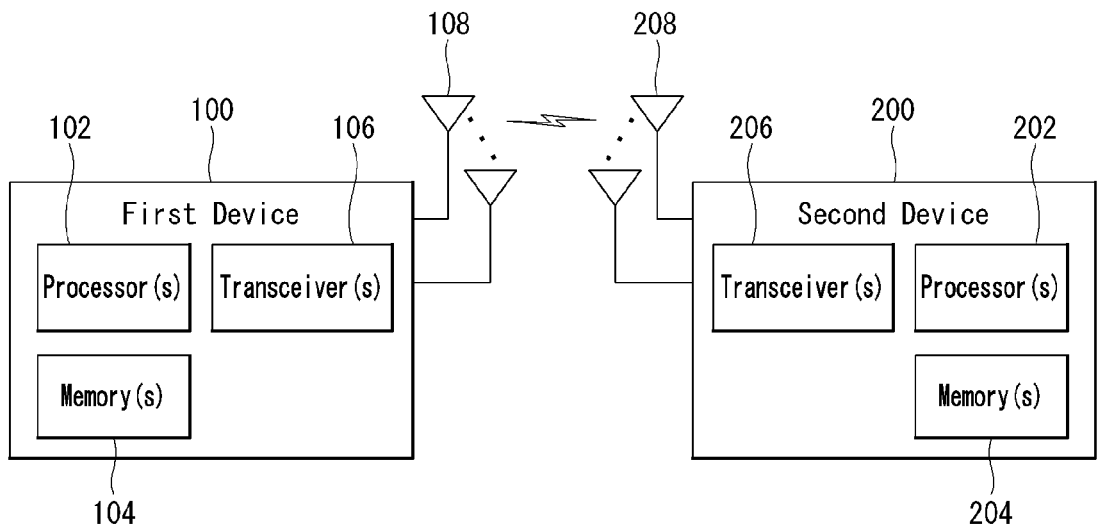

[FIG. 19]
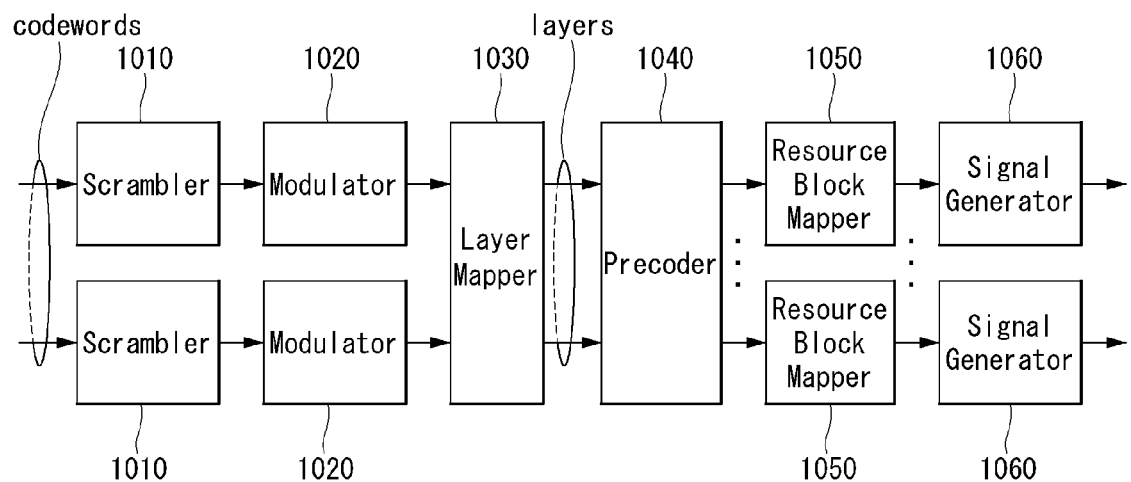
[FIG. 20]
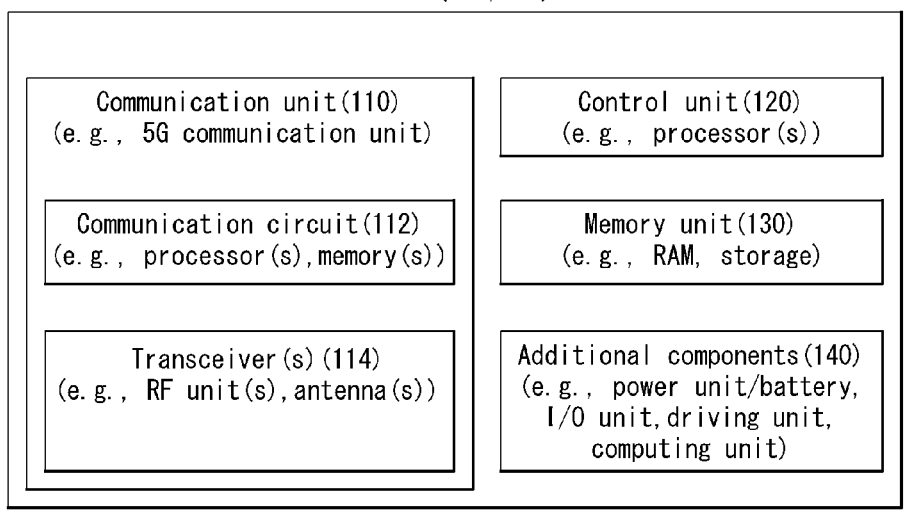

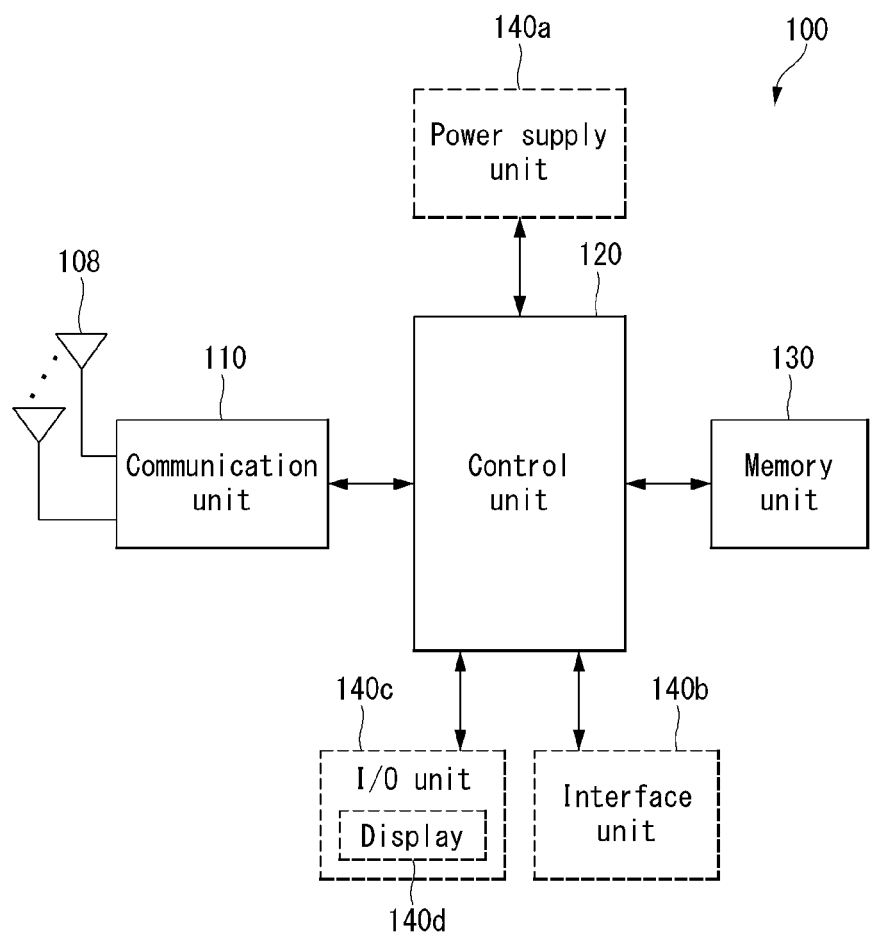
[FIG. 21]

METHOD FOR TRANSMITTING OR RECEIVING DATA CHANNEL IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2020/005747, filed on Apr. 29, 2020, which claims the benefit of KR Application No. 10-2019-0051175, filed on May 1, 2019, the contents of which are all hereby incorporated by reference herein in their entirety.

TECHNICAL FIELD

The present disclosure relates to a wireless communication system and, more particularly, to a method for transmitting or receiving a data channel to improve reliability based on multiple transmission reception points (TRP) and an apparatus supporting the same.

BACKGROUND ART

Mobile communication systems have been developed to provide a voice service while ensuring the activity of a user. However, in the mobile communication system, not only a voice, but also a data service is extended. At present, there is a shortage of resources due to an explosive increase in traffic, and users demand a higher speed service. As a result, a more advanced mobile communication system is required.

Requirements for a next-generation mobile communication system should be able to support the acceptance of explosive data traffic, a dramatic increase in the per-user data rate, the acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

DISCLOSURE

Technical Problem

The present disclosure proposes a method in which a UE supported by multiple transmission reception points (TRPs) transmits or receives a data channel in a wireless communication system.

Specifically, the present disclosure proposes a method of multiplexing in consideration of a resource domain in which a transport block is transmitted through a data channel in M-TRP URLLC transmission.

Furthermore, the present disclosure proposes a method of configuring a repetition scheme in relation to repeated transmission of transport blocks.

Furthermore, the present disclosure proposes a mapping rule between TCI states and a resource domain in consideration of a multiplexing method for resource domains.

Furthermore, the present disclosure proposes a method of mapping TCI states in consideration of a time offset between a DCI and a data channel scheduled by the DCI.

Furthermore, the present disclosure proposes a method of configuring a default TCI state by considering whether it is for a single DCI-based MTRP transmission or a multiple DCI-based MTRP transmission.

Technical objects to be achieved by the present disclosure are not limited to the aforementioned technical objects, and other technical objects not described above may be evidently understood by a person having ordinary skill in the art to which the present disclosure pertains from the following description.

Technical Solution

An exemplary embodiment of the present disclosure provides a method for receiving a data channel by a user equipment (UE) in a wireless communication system, the method comprising: receiving downlink control information (DCI), wherein the DCI includes i) a transmission configuration indication (TCI) field and ii) an antenna port field; and receiving the data channel based on the DCI, wherein multiple TCI states is indicated based on the TCI field, a demodulation reference signal (DM-RS) port is indicated based on the antenna port field, and a repetition scheme of the data channel is determined based on the number of code division multiplexing (CDM) groups including a DM-RS port in which the data channel is received.

Furthermore, in the method according to one embodiment of the present disclosure, based on that the DM-RS port through which the data channel is received is included in one CDM group, the repetition scheme may be determined as either i) a scheme based on frequency resource division or ii) a scheme based on time resource division.

Furthermore, in the method according to one embodiment of the present disclosure, based on that the DM-RS port through which the data channel is received is included in a plurality of CDM groups, each of the multiple TCI states may correspond to different CDM group.

Furthermore, the method according to one embodiment of the present disclosure may further include: receiving configuration information, the configuration information includes information related to the repetition scheme, wherein the repetition scheme is determined based on the number of CDM groups including a DM-RS port in which the data channel is received and the configuration information.

Furthermore, in the method according to one embodiment of the present disclosure, the multiple TC states may be cyclically mapped to the frequency resource or the time resource.

Furthermore, in the method according to one embodiment of the present disclosure, if the time resource is divided into slots, and the same transport block is repeatedly received in each slot through the data channel, the multiple TCI states may be cyclically mapped to the slots.

Furthermore, in the method according to one embodiment of the present disclosure, if the repetition scheme is determined as the scheme based on time resource division, the time resource may be divided into repetition units, and the same transport block may be repeatedly received for each of the repetition units through the data channel.

Furthermore, in the method according to one embodiment of the present disclosure, if a first repetition unit is received within a particular time duration from the reception time of the DCI, a TCI state associated with a control resource set corresponding to the lowest ID may be mapped to the first repetition unit.

Furthermore, in the method according to one embodiment of the present disclosure, the multiple TCI states may be cyclically mapped for a repetition unit received after the particular time duration.

Furthermore, in the method according to one embodiment of the present disclosure, a second repetition unit received after the particular time duration and the TCI state associated with the control resource set may be mapped to each other.

An exemplary embodiment of the present disclosure provides a user equipment (UE) for transmitting or receiving data in a wireless communication system, the UE comprising: one or more transceivers; one or more processors; and one or more memories that store instructions on operations executed by the one or more processors and are connected to the one or more processors, wherein the operations comprise: receiving downlink control information (DCI), wherein the DCI includes i) a transmission configuration indication (TCI) field and ii) an antenna port field; and receiving the data channel based on the DCI, wherein multiple TCI states is indicated based on the TCI field, a demodulation reference signal (DM-RS) port is indicated based on the antenna port field, and a repetition scheme of the data channel is determined based on the number of code division multiplexing (CDM) groups including a DM-RS port in which the data channel is received.

An exemplary embodiment of the present disclosure provides a method for transmitting a data channel by a base station (BS) in a wireless communication system, the method comprising: transmitting downlink control information (DCI) to a user equipment (UE), wherein the DCI includes i) a transmission configuration indication (TCI) field and ii) an antenna port field; and transmitting the data channel to the UE based on the DCI, wherein multiple TCI states is indicated based on the TCI field, a demodulation reference signal (DM-RS) port is indicated based on the antenna port field, and a repetition scheme of the data channel is determined based on the number of code division multiplexing (CDM) groups including a DM-RS port in which the data channel is received.

An exemplary embodiment of the present disclosure provides a base station (BS) for transmitting or receiving data in a wireless communication system, the base station comprising: one or more transceivers; one or more processors; and one or more memories that store instructions on operations executed by the one or more processors and are connected to the one or more processors, wherein the operations comprise: transmitting downlink control information (DCI) to a user equipment (UE), wherein the DCI includes i) a transmission configuration indication (TCI) field and ii) an antenna port field; and transmitting the data channel to the UE based on the DCI, wherein multiple TCI states are indicated based on the TCI field, a demodulation reference signal (DM-RS) port is indicated based on the antenna port field, and a repetition scheme of the data channel is determined based on the number of code division multiplexing (CDM) groups including a DM-RS port in which the data channel is transmitted.

An exemplary embodiment of the present disclosure provides an apparatus comprising one or more memories and one or more processors functionally connected to the one or more memories, wherein the apparatus controls the one or more processors to receive downlink control information (DCI) and receive the data channel based on the DCI, the DCI including i) a transmission configuration indication (TCI) field and ii) an antenna port field, wherein multiple TCI states are indicated based on the TCI field, a demodulation reference signal (DM-RS) port is indicated based on the antenna port field, and a repetition scheme of the data channel is determined based on the number of code division multiplexing (CDM) groups including a DM-RS port in which the data channel is received.

An exemplary embodiment of the present disclosure provides one or more non-transitory computer-readable mediums storing one or more instructions, wherein the one or more instructions are executable by one or more processors comprise instructions that instruct a user equipment (UE) to receive downlink control information (DCI) and receive the data channel based on the DCI, the DCI including i) a transmission configuration indication (TCI) field and ii) an antenna port field, wherein multiple TCI states are indicated based on the TCI field, a demodulation reference signal (DM-RS) port is indicated based on the antenna port field, and a repetition scheme of the data channel is determined based on the number of code division multiplexing (CDM) groups including a DM-RS port in which the data channel is received.

Advantageous Effects

In accordance with an embodiment of the present disclosure, a UE supported by multiple transmission reception points (TRPs) may transmit or receive a data channel.

Furthermore, in accordance with an embodiment of the present disclosure, multiplexing may be done in consideration of a resource domain in which a transport block is transmitted through a data channel in M-TRP URLLC transmission.

Furthermore, in accordance with an embodiment of the present disclosure, a repetition scheme may be configured in relation to repeated transmission of transport blocks, which clearly identifies which repetition scheme a transmission is performed based on.

Furthermore, in accordance with an embodiment of the present disclosure, a mapping between TCI states and a resource domain may be performed in consideration of a multiplexing method for resource domains or a repetition scheme.

Furthermore, in accordance with an embodiment of the present disclosure, a default TCI state may be configured for each TRP.

Effects which may be obtained from the disclosure are not limited by the above effects, and other effects that have not been mentioned may be clearly understood from the following description by those skilled in the art to which the disclosure pertains.

DESCRIPTION OF DRAWINGS

The accompany drawings, which are included to provide a further understanding of the present disclosure and are incorporated on and constitute a part of this specification illustrate embodiments of the present disclosure and together with the description serve to explain the principles of the present disclosure.

FIG. 1 is a diagram illustrating an example of an overall system structure of NR to which a method proposed in the disclosure may be applied.

FIG. 2 illustrates a relationship between an uplink frame and a downlink frame in a wireless communication system to which a method proposed in the disclosure may be applied.

FIG. 3 illustrates an example of a frame structure in an NR system.

FIG. 4 illustrates an example of a resource grid supported by a wireless communication system to which a method proposed in the disclosure may be applied.

FIG. 5 illustrates examples of a resource grid for each antenna port and numerology to which a method proposed in the disclosure may be applied.

FIG. 6 illustrates physical channels and general signal transmission.

FIG. 7 illustrates an example of a downlink transmission/reception operation.

FIG. 8 illustrates an example of an uplink transmission/reception operation.

FIG. 9 illustrates an example of a transmission/reception method for improving reliability using transmission in multiple TRPs.

FIG. 10 shows an example of a TDM-based M-TRP URLLC transmission in which four slots are aggregated.

FIG. 11 shows an example of a TCI mapping rule (method) that considers a threshold-sched-offset.

FIG. 12 shows another example of a TCI mapping rule (method) that considers a threshold-sched-offset.

FIG. 13 shows an example of TCI mapping when a first TB is transmitted over a time duration of a threshold-sched-offset.

FIG. 14 shows an example of a signaling procedure in which data transmission and reception are performed between a network side and a UE when there are multiple TRPs to which methods and/or embodiments proposed in the present disclosure are applicable.

FIG. 15 shows an example of a flowchart of an operation of a UE performing data transmission and reception to which a method and/or embodiment proposed in the present disclosure is applicable.

FIG. 16 shows an example of a flowchart of an operation of a base station performing data transmission and reception to which a method and/or embodiment proposed in the present disclosure is applicable.

FIG. 17 illustrates a communication system applied to the disclosure.

FIG. 18 illustrates a wireless device which may be applied to the disclosure.

FIG. 19 illustrates a signal processing circuit for a transmit signal.

FIG. 20 illustrates another example of a wireless device applied to the disclosure.

FIG. 21 illustrates a portable device applied to the disclosure.

MODE FOR DISCLOSURE

Reference will now be made in detail to embodiments of the disclosure, examples of which are illustrated in the accompanying drawings. A detailed description to be disclosed below together with the accompanying drawing is to describe exemplary embodiments of the disclosure and not to describe a unique embodiment for carrying out the disclosure. The detailed description below includes details to provide a complete understanding of the disclosure. However, those skilled in the art know that the disclosure may be carried out without the details.

In some cases, in order to prevent a concept of the disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the disclosure is described based on the 3GPP communication system (e.g., LTE-A or NR), but the technical spirit of the disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR may be collectively referred to as the 3GPP system. Matters disclosed in a standard document opened before the disclosure may be referred to for a background art, terms, omissions, etc., used for describing the disclosure. For example, the following documents may be referred to.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding 38.213: Physical layer procedures for control
38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver may drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system may support remote treatment providing clinical treatment at a distant place. This helps to reduce a barrier for the distance and may improve access to medical services which are not continuously used at remote farming areas. Furthermore, this is used to save life in important treatment and an emergency condition. A radio sensor network based on mobile communication may provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

DEFINITION OF TERMS eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of a NR system to which a method proposed in the disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

NR(New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or $\mu$). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is more than 60 kHz, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=(1f_{max} \cdot N_f)$. In this case, $\Delta f_{max}=480 \cdot 10^3$, and $N_f=4096$. DL and UL transmission is configured as a radio frame having a section of $T_f=(\Delta f_{max}/N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 2 illustrates a relation between an uplink frame and a downlink frame in a wireless communication system to which a method proposed in the disclosure is applicable.

As illustrated in FIG. 2, uplink frame number i for transmission from a user equipment (UE) shall start $T_{TA}=N_{TA}T_s$, before the start of a corresponding downlink frame at the corresponding UE.

Regarding the numerology $\mu$, slots are numbered in increasing order of $n_s^{\mu} \in \{0, \ldots, N_{subframe}^{slots, \mu}-1\}$ within a subframe and are numbered in increasing order of $n_{s,f}^{\mu} \in \{0, \ldots, N_{frame}^{slots, \mu}-1\}$ within a radio frame. One slot consists of consecutive OFDM symbols of $N_{symb}^{\mu}$, and $N_{symb}^{\mu}$ is determined depending on a numerology used and slot configuration. The start of slots $n_s^{\mu}$ in a subframe is aligned in time with the start of OFDM symbols $n_s^{\mu} N_{symb}^{\mu}$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame, \mu}$ of slots per radio frame, and the number $N_{slot}^{subframe, \mu}$ of slots per subframe in a normal CP. Table 4 represents the number of OFDM symbols per slot, the number of slots per radio frame, and the number of slots per subframe in an extended CP.

TABLE 3

| $\mu$ | $N_{symb}^{slot}$ | $N_{slot}^{frame, \mu}$ | $N_{slot}^{subframe, \mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame, \mu}$ | $N_{slot}^{subframe, \mu}$ |
| --- | --- | --- | --- |
| 2 | 12 | 40 | 4 |

FIG. 3 illustrates an example of a frame structure in a NR system. FIG. 3 is merely for convenience of explanation and does not limit the scope of the disclosure.

In Table 4, in case of $\mu=2$, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the disclosure is applicable.

Referring to FIG. 4, a resource grid consists of $N_{RB}^{\mu}N_{sc}^{RB}$ subcarriers on a frequency domain, each subframe consisting of $14 \cdot 2\mu$ OFDM symbols, but the disclosure is not limited thereto.

In the NR system, a transmitted signal is described by one or more resource grids, consisting of $N_{RB}^{\mu}N_{sc}^{RB}$ subcarriers, and $2^{\mu}N_{symb}^{(\mu)}$ OFDM symbols, where $N_{RB}^{\mu} \leq N_{RB}^{max, \mu}$. $N_{RB}^{max, \mu}$ denotes a maximum transmission bandwidth and may change not only between numerologies but also between uplink and downlink.

In this case, as illustrated in FIG. 5, one resource grid may be configured per numerology $\mu$ and antenna port p.

FIG. 5 illustrates examples of a resource grid per antenna port and numerology to which a method proposed in the disclosure is applicable.

Each element of the resource grid for the numerology $\mu$ and the antenna port p is called a resource element and is uniquely identified by an index pair (k, l̄), where k=0, ..., $N_{RB}^{\mu}N_{sc}^{RB}-1$ is an index on a frequency domain, and l=0, ... $2^{\mu}N_{symb}^{(\mu)}-1$ refers to a location of a symbol in a subframe. The index pair (k,l̄) is used to refer to a resource element in a slot, where l=0, ..., $N_{symb}^{\mu}-1$.

The resource element (k,l̄) for the numerology $\mu$ and the antenna port p corresponds to a complex value $a_{k,l̄}^{(p,\mu)}$. When there is no risk for confusion or when a specific antenna port or numerology is not specified, the indices p and $\mu$ may be dropped, and as a result, the complex value may be $a_{k,l̄}^{(p)}$ or $a_{k,l̄}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN);

The common resource blocks are numbered from 0 and upwards in the frequency domain for subcarrier spacing configuration $\mu$.

The center of subcarrier 0 of common resource block 0 for the subcarrier spacing configuration μ coincides with "point A". A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to size $N_{BWP,i}^{size}-1$, where i is No. Of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

Physical Channel and General Signal Transmission

FIG. 6 illustrates physical channels and general signal transmission. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

For example, in an NR system, DCI format 0_0 and DCI format 0_1 are used for scheduling of PUSCH in one cell, and DCI format 1_0 and DCI format 1_1 are used for scheduling PDSCH in one cell. Information included in DCI format 0_0 is CRC scrambled by C-RNTI or CS-RNTI or MCS-C-RNTI and transmitted. And, DCI format 0_1 is used for reserving PUSCH in one cell. Information included in DCI format 0_1 may be CRC scrambled by C-RNTI or CS-RNTI or SP-CSI-RNTI or MCS-C-RNTI and transmitted. DCI format 1_0 is used for scheduling PDSCH in one DL cell. Information included in DCI format 1_0 is CRC scrambled by C-RNTI or CS-RNTI or MCS-C-RNTI and transmitted. DCI format 1_1 is used for scheduling PDSCH in one cell. Information included in DCI format 1_1 is CRC scrambled by C-RNTI or CS-RNTI or MCS-C-RNTI and transmitted. DCI format 2_1 is used to inform PRB(s) and OFDM symbol(s) that the UE may assume that transmission is not intended. The following information included in DCI format 2_1 such as preemption indication 1, preemption indication 2, . . . , preemption indication N is CRC scrambled by INT-RNTI and transmitted.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

DL and UL Transmission/Reception Operation

DL Transmission/Reception Operation

FIG. 7 illustrates an example of a downlink transmission and reception operation.

Referring to FIG. 7, the eNB may schedule downlink transmission such as the frequency/time resource, the transport layer, an downlink precoder, the MCS, etc., (S701). Specifically, the eNB may determine a beam for PDSCH transmission to the UE. In addition, the UE may receive Downlink Control Information (DCI) for downlink scheduling (i.e., including scheduling information of the PDSCH) on the PDCCH (S702). DCI format 1_0 or DCI format 1_1 may be used for the downlink scheduling and specifically, DCI format 1_1 may include information such as the following examples: Identifier for DCI formats, Bandwidth part indicator, Frequency domain resource assignment, Time domain resource assignment, PRB bundling size indicator, Rate matching indicator, ZP CSI-RS trigger, Antenna port(s), Transmission configuration indication (TCI), SRS request, and Demodulation Reference Signal (DMRS) sequence initialization.

In particular, according to each state indicated in an antenna port(s) field, the number of DMRS ports may be scheduled, and single-user (SU)/Multi-user (MU) transmission scheduling is also available. In addition, the TCI field consists of 3 bits, and the QCL for the DMRS may be dynamically indicated by indicating a maximum of 8 TCI states according to the TCI field value. The UE may receive downlink data from the base station on the PDSCH (S703). When the UE detects a PDCCH including DCI format 1_0 or 1_1, the UE may decode the PDSCH according to an indication by the corresponding DCI.

Here, when the UE receives a PDSCH scheduled by DCI format 1_1, a DMRS configuration type may be configured by higher layer parameter "dmrs-Type" in the UE and the DMRS type is used for receiving the PDSCH. Further, in the UE, the maximum number of front-loaded DMRS symbols for the PDSCH may be configured by higher layer parameter "maxLength."

In the case of DMRS configuration type 1, when a single codeword is scheduled and an antenna port mapped to an index of {2, 9, 10, 11, or 30} is designated in the UE or when two codewords are scheduled in the UE, the UE assumes that all remaining orthogonal antenna ports are not associated with PDSCH transmission to another UE. Alternatively, in the case of DMRS configuration type 2, when a single codeword is scheduled and an antenna port mapped to an index of {2, 10, or 23} is designated in the UE or when two codewords are scheduled in the UE, the UE assumes that all remaining orthogonal antenna ports are not related to PDSCH transmission to another UE.

When the UE receives the PDSCH, a precoding granularity P' may be assumed as a consecutive resource block in the frequency domain. Here, P' may correspond to one value of {2, 4, and wideband}. When P' is determined as wideband, the UE does not predict that the PDSCH is scheduled to non-contiguous PRBs and the UE may assume that the same precoding is applied to the allocated resource. On the contrary, when P' is determined as any one of {2 and 4}, a Precoding Resource Block (PRG) is split into P' consecutive PRBs. The number of actually consecutive PRBs in each PRG may be one or more. The UE may assume that the same precoding is applied to consecutive downlink PRBs in the PRG.

In order to determine a modulation order in the PDSCH, a target code rate, and a transport block size, the UE may first read a 5-bit MCD field in the DCI and determine the modulation order and the target code rate. In addition, the UE may read a redundancy version field in the DCI and determine a redundancy version. In addition, the UE may determine the transport block size by using the number of layers before rate matching and the total number of allocated PRBs.

A transport block may be made up of one or more code block groups (CBG), and one CBG may be made up of one or more code blocks (CB). Also, in an NR system, data transmission and reception may be performed for each CB/CBG as well as for each transport block. Accordingly, ACK/NACK transmission and retransmission per CB/CBG also may be possible. The UE may receive information on CB/CBG from the base station through a DCI (e.g., DCI format 0_1 and DCI format 1_1). Also, the UE may receive information on a data transmission unit (e.g., TB/CB/CBG) from the base station.

UL Transmission/Reception Operation

FIG. 8 illustrates an example of an uplink transmission and reception operation. Referring to the FIG. 8, the eNB may schedule uplink transmission such as the frequency/time resource, the transport layer, an uplink precoder, the MCS, etc., (S801). In particular, the eNB may determine a beam for PUSCH transmission of the UE through the beam management operations described above. And, the UE may receive, from the eNB, DCI for uplink scheduling (i.e., including scheduling information of the PUSCH) on the PDCCH (S802).

DCI format 0_0 or 0_1 may be used for the uplink scheduling and in particular, DCI format 0_1 may include information such as the following examples: Identifier for DCI formats, UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, and Uplink Shared Channel (UL-SCH) indicator.

In particular, configured SRS resources in an SRS resource set associated with higher layer parameter "usage" may be indicated by an SRS resource indicator field. Further, "spatialRelationInfo" may be configured for each SRS resource and a value of "spatialRelationInfo" may be one of {CRI, SSB, and SRI}.

In addition, the UE may transmit the uplink data to the eNB on the PUSCH (S803). When the UE detects a PDCCH including DCI format 0_0 or 0_1, the UE may transmit the corresponding PUSCH according to the indication by the corresponding DCI. two schemes (Codebook based transmission scheme and non-codebook based transmission scheme) are supported for PUSCH transmission.

In the case of the codebook based transmission, when higher layer parameter txConfig" is set to "codebook", the UE is configured to the codebook based transmission. On the contrary, when higher layer parameter txConfig" is set to "nonCodebook", the UE is configured to the non-codebook based transmission. When higher layer parameter "txConfig" is not configured, the UE does not predict that the PUSCH is scheduled by DCI format 0_1. When the PUSCH is scheduled by DCI format 0_0, the PUSCH transmission is based on a single antenna port. In the case of the codebook based transmission, the PUSCH may be scheduled by DCI format 0_0, DCI format 0_1, or semi-statically. When the PUSCH is scheduled by DCI format 0_1, the UE determines a PUSCH transmission precoder based on the SRI, the Transmit Precoding Matrix Indicator (TPMI), and the transmission rank from the DCI as given by the SRS resource indicator and the Precoding information and number of layers field. The TPMI is used for indicating a precoder to be applied over the antenna port and when multiple SRS resources are configured, the TPMI corresponds to the SRS resource selected by the SRI. Alternatively, when the single SRS resource is configured, the TPMI is used for indicating the precoder to be applied over the antenna port and corresponds to the corresponding single SRS resource. A transmission precoder is selected from an uplink codebook having the same antenna port number as higher layer parameter "nrofSRS-Ports". When the UE is set to higher layer parameter "txConfig" set to "codebook", at least one SRS resource is configured in the UE. An SRI indicated in slot n is associated with most recent transmission of the SRS resource identified by the SRI and here, the SRS resource precedes PDCCH (i.e., slot n) carrying the SRI.

In the case of the non-codebook based transmission, the PUSCH may be scheduled by DCI format 0_0, DCI format 0_1, or semi-statically. When multiple SRS resources are configured, the UE may determine the PUSCH precoder and the transmission rank based on a wideband SRI and here, the SRI is given by the SRS resource indicator in the DCI or given by higher layer parameter "srs-ResourceIndicator". The UE may use one or multiple SRS resources for SRS transmission and here, the number of SRS resources may be configured for simultaneous transmission in the same RB based on the UE capability. Only one SRS port is configured for each SRS resource. Only one SRS resource may be configured to higher layer parameter "usage" set to "non-Codebook". The maximum number of SRS resources which may be configured for non-codebook based uplink transmission is 4. The SRI indicated in slot n is associated with most recent transmission of the SRS resource identified by the SRI and here, the SRS transmission precedes PDCCH (i.e., slot n) carrying the SRI.

Beam-Related Indication

A UE may be RRC configured with a list of up to M candidate Transmission Configuration Indication (TCI) states at least for the purposes of QCL (Quasi Co-location) indication. Here, M may be 64.

Each TCI state may be configured in one RS set. IDs of each DL RS for the purpose of spatial QCL (QCL Type D) at least in the RS set may refer to one of DL RS types such as SSB, P-CSI RS, SP-CSI RS, and A-CSI RS.

Initialization/update for the ID of DL RS(s) in the RS set that are used at least for the purpose of spatial QCL may be performed at least by explicit signaling.

Table 5 shows an example of TCI-State IE.

The TCI-State IE associates one or two DL reference signals (RS) with a corresponding quasi co-location (QCL) type.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and

TABLE 5

```
-- ASN1START
-- TAG-TCI-STATE-START
TCI-State ::=                SEQUENCE {
    tci-StateId                  TCI-StateId,
    qcl-Type1                    QCL-Info,
    qcl-Type2                    QCL-Info                              OPTIONAL, -- Need R
    ...
}
QCL-Info ::=                 SEQUENCE {
    cell                         ServCellIndex                         OPTIONAL, -- Need R
    bwp-Id                       BWP-Id                                OPTIONAL, -- Cond CSI-RS-Indicated
    referenceSignal              CHOICE {
        csi-rs                       NZP-CSI-RS-ResourceId,
        ssb                          SSB-Index
    },
    qcl-Type                     ENUMERATED {typeA, typeB, typeC, typeD},
    ...
}
-- TAG-TCI-STATE-STOP
-- ASN1STOP
```

In Table 5, a bwp-Id parameter indicates DL BWP where RS is positioned, a cell parameter indicates a carrier where RS is positioned, a reference signal parameter indicates a reference antenna port(s) that is a source of quasi co-location for a corresponding target antenna port(s), or a reference signal including it. The target antenna port(s) may be CSI-RS, PDCCH DMRS, or PDSCH DMRS. For example, a corresponding TCI state ID may be indicated to NZP CSI-RS resource configuration information to indicate QCL reference RS information for NZP CSI-RS. As another example, a TCI state ID may be indicated in each CORESET configuration to indicate QCL reference information for the PDCCH DMRS antenna port(s). As another example, a TCI state ID may be indicated through DCI to indicate QCL reference information for the PDSCH DMRS antenna port(s).

Quasi-Co Location (QCL)

The antenna port is defined so that a channel over which a symbol on an antenna port is conveyed may be inferred from a channel over which another symbol on the same antenna port is conveyed. When properties of a channel over which a symbol on one antenna port is conveyed may be inferred from a channel over which a symbol on another antenna port is conveyed, the two antenna ports may be considered as being in a quasi co-located or quasi co-location (QC/QCL) relationship.

qcl-Type2 for the second DL RS (if configured). For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

The descriptions (e.g., 3GPP system, frame structure, DL and UL transmission and reception, etc.) given above may be applied/used in combination with methods and/or embodiments proposed in the present disclosure or may be supplemented to clarify technical features of the methods proposed in the present disclosure. In the present disclosure, the presence of a slash "/" may indicate that all or only some of words or phrases separated by/are included.

Multiple Transmission and Reception Point (TRP)-Related Operation

The coordinated multi point (CoMP) technique is a scheme in a plurality of base stations exchange (e.g., use X2 interface) or utilize channel information (e.g., RI/CQI/PMI/LI, etc.) fed back from the user equipment (UE) to perform cooperative transmission with the UE, thereby effectively controlling interference. According to the scheme used, the cooperative transmission may be divided into joint transmission (JT), coordinated scheduling (CS), coordinated beamforming (CB), dynamic point selection (DPS), dynamic point blacking (DPB), and the like.

Non-coherent joint transmission (NCJT) may refer to cooperative transmission that does not consider interference (that is, with no interference). For example, the NCJT may be a scheme in which a base station(s) transmits data to one UE through multiple TRPs by using the same time resource and frequency resource. In this scheme, the multiple TRPs of the base station(s) may be configured to transmit data to UE through different layers by using different demodulation reference signal (DMRS) ports. In other words, the NCJT may correspond to a transmission scheme in which transmission of a MIMO layer(s) from two or more TRPs is performed without adaptive precoding between the TRPs.

The NCJT may be categorized into fully overlapped NCJT, in which time and frequency resources used for transmission by each base station (or TRP) are fully overlapped, and partially overlapped NCJT, in which time and frequency resources used for transmission by each base station (or TRP) are partially overlapped. This is only for convenience of explanation in the present disclosure, and it is needless to say that, in the embodiments and methods to be described below, the above-mentioned terms can be replaced with other terms with the same technical meanings. For example, in the case of partially overlapped NCJT, both data of a first base station (e.g., TRP 1) and data of a second base station (e.g., TRP 2) may be transmitted in some of the time resources and/or frequency resources, and data of only one of the first and second base stations may be transmitted in the remaining time resources and/or frequency resources.

TRP transmits data scheduling information to an NCJT receiving UE as DCI (Downlink Control Information). From the perspective of downlink control information (DCI) transmission, M-TRP (multiple TRP) transmission may be divided into i) M-DCI (multiple DCI) based M-TRP transmission in which each TRP transmits a different DCI and ii) S-DCI (single DCI) based M-TRP transmission in which one TRP transmits DCI.

Firstly, the single DCI based MTRP scheme will be described. In the single DCI based MTRP scheme in which a representative TRP transmits scheduling information for data transmitted by itself and data transmitted by another TRP through one DCI, MTRPs cooperatively transmit one common PDSCH and each TRP participating in the cooperative transmission spatially divides the corresponding PDSCH into different layers (i.e., different DMRS ports). In other words, MTRPs transmit one PDSCH but each TRP transmits only some of multiple layers of the PDSCH. For example, when 4-layer data is transmitted, TRP 1 transmits 2 layers, and TRP 2 transmits the remaining 2 layers to the UE.

In this case, scheduling information for the PDSCH is indicated to the UE through one DCI, and the corresponding DCI indicates which DMRS port uses information of which QCL RS and QCL type (which is different from conventionally indicating the QCL RS and TYPE that are commonly applied to all DMRS ports indicated by the DCI). That is, M TCI states (M=2 for 2 TRP cooperative transmission) are indicated through the TCI field in the DCI, and the QCL RS and type are identified by using M TCI states which are different for M DMRS port groups. Also, DMRS port information may be indicated by using a new DMRS table.

As an example, in the case of the S-DCI, since all scheduling information for data transmitted by M TRPs should be delivered through one DCI, the S-DCI may be used in an ideal backhaul (BH) environment in which two TRPs may be dynamically coordinated with each other.

Secondly, the multiple DCI based MTRP method will be described. MTRPs transmit different DCIs and PDSCHs, respectively (the UE receives N DCIs and N PDSCHs from N TRPs), and the corresponding PDSCHs are transmitted by (partially or wholly) overlapping on different time resources. The corresponding PDSCHs are transmitted through different scrambling IDs, and the corresponding DCIs may be transmitted through Coresets belonging to different Coreset groups (A coreset group may be identified as an index defined in the coreset configuration of each Coreset. For example, if Coresets 1 and 2 are set to index=0 and Coresets 3 and 4 are set to index=1, Coresets 1 and 2 belong to Coreset group 0 and Coresets 3 and 4 belong to Coreset group 1. If no index is defined for a coreset, this may be interpreted as index=0). If multiple scrambling IDs are set in one serving cell or two or more coreset groups are set, the UE may know that data is received by multiple DCI-based MTRP operation.

For example, the single DCI based MTRP scheme or the multiple DCI based MTRP scheme may be indicated to the UE through separate signaling. As an example, when a plurality of CRS patterns are indicated to the UE for MTRP operation for one serving cell, PDSCH rate matching for CRS may be different depending on this MTRP operation is a single DCI based MTRP operation or a multiple DCI based MTRP operation.

The base station described in this disclosure may be a generic term for an object that transmits/receives data to and from UE. For example, the base station described herein may be a concept including one or more transmission points (TPs), one or more transmission and reception points (TRPs), and the like. For example, multiple TPs and/or multiple TRPs described herein may be included in one base station or included in multiple base stations. In addition, the TP and/or TRP may include a panel of a base station, a transmission and reception unit, and the like.

In addition, the TRP described in this disclosure means an antenna array having one or more antenna elements available in a network located at a specific geographical location in a specific area. Although this disclosure is described with respect to "TRP" for convenience of explanation, the TRP may be replaced with a base station, a transmission point (TP), a cell (e.g., a macro cell/small cell/pico cell, etc.), an antenna array, or a panel and understood and applied as such.

In addition, the CORESET group ID described in this disclosure may refer to an index/identification information (e.g., ID)/indicator, etc. for distinguishing a CORESET configured for/associated with each TRP/panel (or for each TRP/panel). In addition, the CORESET group may be a group/union of CORESETs which is distinguished by the index/identification information (e.g., ID) for distinguishing the CORESET and the CORESET group ID. For example, the CORESET group ID may be specific index information defined in the CORESET configuration. For example, the CORESET group may be configured/indicated/defined by an index defined in the CORESET configuration for each CORESET. The CORESET group ID may be configured/indicated through higher layer signaling (e.g., RRC signaling)/L2 signaling (e.g., MAC-CE)/L1 signaling (e.g., DCI).

M-TRP Transmission

M-TRP transmission by which multiple (e.g., M) TRPs transmit data to one user equipment (UE) may be divided into two main types of transmission: eMBB M-TRP transmission (or M-TRP eMMB) which is a scheme for increasing a transmission rate and URLLC M-TRP transmission (or M-TRP URLLC) which is a scheme for increasing a reception success rate and reducing latency.

URLLC M-TRP may mean that M-TRPs transmit the same TB (Transport Block) using different resources (e.g., layers/time resources/frequency resources, etc.). A number of TCI state(s) may be indicated by DCI to a UE configured with the URLLC M-TRP transmission scheme, and data received using the QCL reference signal (RS) of each TCI state may be assumed to be the same TB. On the other hand, eMBB M-TRP may mean that M-TRPs transmit different TBs using different resources (e.g., layers/time resources/frequency resources, etc.). A number of TCI state(s) may be indicated by DCI to a UE configured with the eMBB M-TRP transmission scheme, and data received using the QCL RS of each TCI state may be assumed to be different TBs.

For example, the UE may decide/determine whether the corresponding M-TRP transmission is URLLC transmission or eMBB transmission since it uses the RNTI configured for MTRP-URLLC and the RNTI configured for MTRP-eMBB, separately. That is, if the CRC masking of the DCI received by the UE is performed using the RNTI configured for the MTRP-URLLC purpose, this may correspond to URLLC transmission, and if the CRC masking of the DCI is performed using the RNTI configured for the MTRP-eMBB purpose, this may correspond to eMBB transmission.

Table 6 shows various schemes that can be considered for URLLC M-TRP transmission. Referring to Table 6, there exist various schemes such as SDM/FDM/TDM.

TABLE 6

To facilitate further down-selection for one or more schemes in RAN1#96bis, schemes for multi-TRP based URLLC, scheduled by single DCI at least, are clarified as following:
    Scheme 1 (SDM): n (n <= $N_s$) TCI states within the single slot, with overlapped time and frequency resource allocation
    Scheme 1a:
        Each transmission occasion is a layer or a set of layers of the same TB, with each layer or layer set is associated with one TCI and one set of DMRS port(s).
        Single codeword with one RV is used across all spatial layers or layer sets. From the UE perspective, different coded bits are mapped to different layers or layer sets with the same mapping rule as in Rel-15.
    Scheme 1b:
        Each transmission occasion is a layer or a set of layers of the same TB, with each layer or layer set is associated with one TCI and one set of DMRS port(s).
        Single codeword with one RV is used for each spatial layer or layer set. The RVs corresponding to each spatial layer or layer set can be the same or different.
    Scheme 1c:
        One transmission occasion is one layer of the same TB with one DMRS port associated with multiple TCI state indices, or one layer of the same TB with multiple DMRS ports associated with multiple TCI state indices one by one.
    For Scheme 1a and 1e, the same MCS is applied for all layers or layer sets.
    For scheme 1b, same or different MCS/modulation orders for different layers or layer sets can be discussed.
        Scheme 2 (FDM): n (n <= $N_f$) TCI states within the single slot, with non-overlapped frequency resource allocation
    Each non-overlapped frequency resource allocation is associated with one TCI state.
    Same single/multiple DMRS port(s) are associated with all non-overlapped frequency resource allocations.
    Scheme 2a:
        Single codeword with one RV is used across full resource allocation. From UE perspective, the common RB mapping (codeword to layer mapping) is applied across full resource allocation.
    Scheme 2b:
        Single codeword with one RV is used for each non-overlapped frequency resource allocation.
        The RVs corresponding to each non-overlapped frequency resource allocation can be the same or different.
    For scheme 2a, same MCS is applied for all non-overlapped frequency resource allocations
    For scheme 2b, same or different MCS/modulation orders for different non-overlapped frequency resource allocations can be discussed.
    Details of frequency resource allocation mechanism for FDM 2a/2b with regarding to allocation granularity, time domain allocation can be discussed.
    Scheme 3 (TDM): n (n <= $N_{t1}$) TCI states within the single Slot, with non-overlapped time resource allocation
        Each transmission occasion of the TB has one TCI and one RV with the time granularity of mini-slot.
        All transmission occasion (s) within the slot use a common MCS with same single or multiple. DMRS port(s),
        RV/TCI state can be same or different among transmission occasions.
        FFS channel estimation interpolation across mini-slots with the same TCI index
    Scheme 4 (TDM): n (n <= $N_{t2}$) TEl states with K (n <= K) different slots,
        Each transmission occasion of the TB has one TEl and one RV
        All transmission occasion (s) across K slots use a common MCS with same single or multiple DMRS port(s)
        RV/TCI state can be same or different among transmission occasions.

TABLE 6-continued

FES channel estimation interpolation across slots with the same TCI index

Note
that M-TRP/panel based URLLC schemes shall be compared in terms of improved reliability, efficiency, and specification impact
Note:
Support of number of layersper TRP may be discussed For example, in relation to the TDM based URLLC scheme, scheme 4 refers to a scheme in which one TRP transmits a TB in one slot, which may increase the probability of data reception through the same TB received from a number of TRPs in a number of slots. Scheme 3 refers to a scheme in which one TRP transmits a TB thorough several consecutive OFDM symbols (i.e., a symbol group), by which a number of TRPs may be configured to transmit the same TB through different symbol groups within one slot.

Method for Improving Reliability in Multi-TRPs

FIG. 9 illustrates an example of a transmission/reception method for improving reliability supported by a plurality of TRPs, and the following two methods may be considered.

The example in (a) of FIG. 9 shows that a layer group transmitting the same codeword (CW)/transport block (TB) correspond to different TRPs. That is, the same CW may be transmitted through different layers/layer groups. In this case, a layer group may refer to some kind of layer set made up of one or more layers. As such, the amount of transmission resources increases as the number of layers increases, and this is advantageous in that robust channel coding with a low code rate can be used for TB. In addition, it is expected that the reliability of received signals may be improved based on diversity gain due to different channels from a plurality of TRPs.

Meanwhile, the example in (b) of FIG. 9 shows an example in which different CWs are transmitted through layer groups corresponding to different TRPs. That is, different CWs may be transmitted through different layers/layer groups. In this case, it may be assumed that TBs corresponding to the first CW (CW #1) and the second CW (CW #2) are the same. Therefore, this can be seen as an example of repeated transmission of the same TB. In the case of (b) of FIG. 9, the code rate corresponding to the TB may be higher than that of (a) of FIG. 9. Still, there is an advantage that a code rate can be adjusted by indicating different redundancy version (RV) values for encoding bits generated from the same TB according to a channel environment, or that a modulation order of each CW may be adjusted.

In (a) of FIG. 9 or (b) of FIG. 9, the same TB is repeatedly transmitted through different layer groups, and each layer group is transmitted by different TRPs/panels, thereby increasing the data reception probability, which may be called spatial division multiplexing (SDM)-based URLLC M-TRP transmission. A layer(s) belonging to different layer groups are transmitted through DMRS ports belonging to different DMRS CDM groups, respectively.

In addition, although the above description regarding multiple TRPs has been given with respect to a spatial division multiplexing (SDM) scheme using different layers, it also may be extensively applied to a frequency division multiplexing (FDM) scheme based on different frequency domain resources (e.g., RB/PRB (set)), and/or a time division multiplexing (TDM) scheme based on different time domain resources (e.g., slots, symbols, and sub-symbols).

Hereinafter, in the present disclosure, methods that can be proposed in consideration of cooperative transmission (e.g., NCJT) between multiple base stations (e.g., multiple TPs/TRPs of one or more base stations) and UE will be described. Concretely, methods of mapping TCI states in performing a multi-TRP-based operation will be proposed.

Although the methods described herein are described based on one or more TP/TRPs of base station(s), the methods may be equally or similarly applied to transmissions based on one or more panels of base station(s). For convenience of explanation, a description will be given with respect to an example in which two TRPs (e.g., TRP1 and TRP2) operate, this does not limit the technical scope of the present disclosure. Accordingly, it is needless to say that this also applies to an example in which three or more TRPs operate.

In the methods proposed in the present disclosure, using a specific TCI state fora resource (e.g., frequency resource/time resource/spatial resource (e.g., layer)) in data reception may mean that a channel is estimated from a DMRS by using a QCL type and QCL RS indicated by the specific TCI state in the corresponding resource (e.g., frequency resource/time resource/spatial resource), and data is received/demodulated through the estimated channel.

<Proposal 1>

As described above, MTRP-URLLC transmission and reception may be divided into i) spatial division multiplexing (SDM) in which the same TB is repeatedly transmitted through different layers (or layer groups), ii) time division multiplexing (TDM) in which the same TB is repeatedly transmitted based on different time domain resources (e.g., slots, symbols, and sub-symbols), and iii) frequency division multiplexing (FDM) in which the same TB is repeatedly transmitted based on different frequency domain resources (e.g., RB/PRB (set)).

In the present disclosure, MTRP-URLLC transmission and reception (e.g., see the schemes in Table 6) may be referred to as a repetition scheme. That is, the repetition scheme may include the above-described i) SDM scheme, ii) TDM scheme, or iii) FDM scheme. In a specific repetition scheme, a resource domain associated with this scheme may be split so that data is repeatedly transmitted. For example, if the repetition scheme is a TDM scheme, a time domain resource may be segmented (e.g., repetition units), and the same TB may be repeatedly transmitted in the time resource segments (e.g., slots).

Alternatively, to achieve higher diversity gain, two or more multiplexing schemes among the SDM scheme, FDM scheme, and TDM scheme may be used so that the same TB is repeatedly transmitted. Here, using a multiplexing scheme may refer to transmitting data by using a resource domain for this scheme. In this case, there is a need to set a mapping rule between a base station and UE which states how multiple TCI states indicated through the TCI field of a single DCI are mapped to different resources (e.g., layers/frequency resources/time resources, etc.).

Proposal 1 in the present disclosure proposes TCI mapping rules (hereinafter, Methods 1-1 to 1-5) between TCI states and a resource domain (e.g., layers/frequency resources/time resources, etc.) in consideration of a multiplexing method (e.g., repetition scheme) such as SDM, FDM, or TDM. In the present disclosure, the TCP mapping rules also may be called TCI mapping methods. Also, in the present disclosure, transmitting and receiving data through a specific resource domain may be construed as transmitting and receiving data by mapping it to a specific resource domain.

For example, if a TCI state(s) is indicated to the UE by the base station, the UE may estimate a channel from a DMRS and receive and demodulate data, based on TCI mapping rules defined/configured as in the proposed methods (e.g., Methods 1-1 to 1-5). In other words, based on the methods (e.g., Methods 1-1 to 1-5) proposed below, the UE may apply the TCI state(s) indicated/configured by the base station to a spatial resource (e.g., layer, DMRS port, etc.) a time resource (e.g., slot/symbol group, etc.), or a frequency resource (e.g., RB/RB set, etc.) to estimate a channel from a DMRS and receive and demodulate data. In this case, it may be assumed that the base station performs data transmission based on the TCI mapping rules defined/configured in the methods (e.g., Methods 1-1 to 1-5) below.

Method 1-1)

It proposes a TCI mapping rule between TCI states and spatial resources in a spatial division multiplexing (SDM) scheme in which the same TB is repeatedly transmitted through different spatial resources (e.g., layers, layer groups, or DMRS ports).

When performing an MTRP-URLLC transmission using the SDM scheme, each TRP (e.g., TRP1 and TRP2) may transmit data using DMRS ports belonging to different DMRS CDM (code division multiplexing) groups. This is for minimizing interference between DMRSs of each TRP by multiplexing the DMRS of TRP 1 and the DMRS of TRP 2 by FDM.

As a consequence, in the MTRP-URLLC transmission using SDM, when indicating a plurality of DMRS ports to a UE, the DMRS ports are indicated in such a way that they are distributed to two or more CDM groups. That is, the base station may indicate, to the UE, DMRS ports corresponding to two or more CDM groups. For example, a DMRS port corresponding to (included in) CDM group 0 and a DMRS port corresponding to CDM group 1 may be indicated.

Also, the base station indicates two TCI states to the UE, each TCI state is mapped to a different CDM group (for example, a 1st TCI state is mapped to the DMRS port of a 1st CDM group, and a 2nd TCI state is mapped to the DMRS port of a 2nd CDM group), and, when estimating a channel from the DMRS port belonging to each CDM group, the channel is estimated by using the TCI state (i.e., QCL RS indicated by the TCI state) mapped to the corresponding CDM group. In the present disclosure, a CDM group is an example of a layer group or DMRS port group, and it is needless to say that a proposal of the present disclosure is applicable even if the CDM group is replaced with a layer group or a DMRS port group.

Method 1-2)

It proposes a TCI mapping rule between TCI states and time resources in a time division multiplexing (TDM) scheme in which the same TB is repeatedly transmitted based on different time domain resources (e.g., slots, symbols, or sub-symbols).

When performing an MTRP-URLLC transmission using TDM, a base station may indicate N TCI states to a UE and indicate that M slots (or OFDM symbol groups) are aggregated to transmit the same TB. For example, for N=M, TCI states and slots may be mapped on a one-to-one basis, and the UE may estimate a channel by using the mapped TCI state when receiving data in each slot. For example, for N<M, TCI states and slots may be cyclically mapped to each other. Specifically, N TCI states may be sequentially mapped to 1st to N-th slots on a one-to-one basis and then a 1st TCI state may be sequentially mapped again to an (N+1)-th slot.

Although the above example has been explained with respect to a mapping method between TCI states and slots, this is only for convenience of explanation and the technical scope of the present disclosure is not limited thereto. Accordingly, it is needless to say that the above TCI mapping rule is also applicable to an MTRP-URLLC transmission using TDM based on different time resource units (e.g., symbols, symbol groups, or sub-slots).

Method 1-3)

It proposes a TCI mapping rule between TCI states and time resources in a frequency division multiplexing (FDM) scheme in which the same TB is repeatedly transmitted based on different frequency domain resources (e.g., RBs/RB sets/PRB (sets)).

The mapping method in the above Method 1-2) may be applicable to FDM as well. When performing an MTRP-URLLC transmission using FDM, a base station may indicate N TCI states to a UE and indicate that M RB sets are aggregated to transmit the same TB. For example, for N=M, TCI states and RB sets may be mapped to each other on a one-to-one basis, and the UE may estimate a channel by using the mapped TCI state when receiving data in each RB set. For example, for N<M, N TCI states may be cyclically mapped to each other. Specifically, N TCI states may be sequentially mapped to 1st to N-th RB sets on a one-to-one basis and then a 1st TCI state may be sequentially mapped again to an (N+1)-th RB set.

Although the above example has been explained with respect to a mapping method between TCI states and RB sets, this is only for convenience of explanation and the technical scope of the present disclosure is not limited thereto. Accordingly, it is needless to say that the above TCI mapping rule is also applicable to an MTRP-URLLC transmission using FDM based on different frequency resource units (e.g., RBs/RB sets/PRB (sets)).

Method 1-4)

In MTRP-URLLC transmission using TDM and/or FDM, when a DMRS port used for data transmission is transmitted through one CDM group, an SDM-based MTRP-URLLC transmission is excluded which requires data to be transmitted through at least two CDM groups. In other words, if a UE receives data using an DMRS port corresponding to one (same) CDM group, this may be recognized as not an SDM-based MTRP-URLLC transmission. Also, when the UE receives a DMRS port corresponding to one (same) CDM group, this may be recognized as a TDM- or FDM-based MTRP-URLLC transmission. Accordingly, the UE may perform channel estimation and data reception by mapping indicated N TCI states to time resources (e.g., symbols, symbol groups, sub-groups, or slots) or frequency resources (e.g., RBs, RB sets, or PRB (sets)) according the above methods (e.g., Method 1-2/Method 1-3).

Method 1-5)

It proposes a TCI mapping rule that may be applied when an M-TRP URLLC transmission is performed by using two or more resource domains among the above-described SDM, TDM, or FDM multiplexing scheme (e.g., repetition scheme).

For example, in an MTRP-URLLC transmission using TDM (or FDM), if a DMRS port used for data transmission is transmitted through two or more CDM groups, it may not be clear whether this is i) MTRP-URLLC using both TDM (or FDM) and SDM or ii) MTRP-URLLC using TDM (or FDM) alone. This is because SDM-based MTRP URLLC transmission may be performed when a DMRS is transmitted through two or more CDM groups. In other words, when a DMRS is transmitted through two or more CDM groups, an SDM-based MTRP URLLC transmission technique may be additionally considered.

In this case, it is possible to determine whether to map N TCI states to i) each CDM group and each slot (or RB set) or to ii) each slot (or RB set), depending on whether the MTRP-URLLC used herein is i) MTRP-URLLC using both TDM (or FDM) and SDM or ii) MTRP-URLLC using TDM (or FDM) alone.

For example, it can be assumed that a DMRS port configured and indicated to aggregate four slots is transmitted through two CDM groups and four TCI states {TCI state 0, TCI state 1, TCI state 2, and TCI state 3} are indicated. In this case, TCI mapping for i) MTRP-URLLC using both TDM (or FDM) and SDM or ii) MTRP-URLLC using TDM (or FDM) alone may be performed as follows.

i) For MTRP-URLLC using both TDM (or FDM) and SDM, TCI state 0 may be mapped to the 1st CDM group of the 1st slot, TCI state 1 may be mapped to the 2nd CDM group of the 1st slot, TCI state 2 may be mapped to the 1st CDM group of the 2nd slot, and TCI state 3 may be mapped to the 2nd CDM group of the 2nd slot. Afterwards, TCI states 1, 2, 3, and 4 may be mapped again sequentially, from the 1st CDM group of the 3rd slot to the 2nd CDM group of the 4th slot (i.e., cyclic mapping).

ii) For MTRP-URLLC using TDM (or FDM) alone, two CDM groups are mapped to the same TCI state. Thus, TCI state(s) may be sequentially mapped to each slot. For example, TCI state 0 may be mapped to the 1st slot, TCI state 1 may be mapped to the 2nd slot, TCI state 2 may be mapped to the 3rd slot, and TCI state 3 may be sequentially mapped to the 4th slot, sequentially and respectively.

Although the operation explained in the above method 1-5 has been described with respect to TDM, it may be equally applied to FDM.

As a stronger scheduling limitation in relation to the above methods (e.g., Methods 1-1 to 1-5), a DMRS port may always use one (same) CDM group alone by rank 1 transmission in the case of a TDM (or FDM) MTRP-URLLC transmission without SDM M-TRP URLLC. In other words, if the same TB is repeatedly transmitted based on different time domain resources (e.g., slots/symbols/symbol groups/sub-slots) or different frequency domain resources (e.g., RBs/RB sets/PRB (sets)), the same TB may be repeatedly transmitted through a DMRS port(s) corresponding (included in) one (same) CDM group.

For example, if one (same) CDM group is indicated, the UE may receive data by sequentially and cyclically mapping N TCI states to time resources (e.g., slots/symbols/symbol groups/sub-slots) or frequency resources (e.g., RBs/RB sets/ PRB (sets)) by one of the above-described methods 1-2 to 1-4. If two CDM groups are indicated, the UE may assume that both TDM (or FDM) and SDM are used, and may receive data by sequentially and cyclically mapping TCI states to both CDM groups and time resources (or frequency resources).

Another method to consider in relation to the above methods (e.g., Methods 1-1 to 1-5) is that, if TDM (or FDM) M-TRP URLLC transmission is performed without SDM-M-TRP URLLC, rank 1 transmission is always indicated so that a DMRS always uses one (same) CDM group, for strong scheduling limitations.

For example, if rank 1 is indicated, the UE may receive data by sequentially and cyclically mapping N TCI states to time resources (e.g., slots/symbols/symbol groups/sub-slots) or frequency resources (e.g., RBs/RB sets/PRB (sets)) by one of the above-described methods 1-2 to 1-4. If rank 2 or higher is indicated, the UE may assume that both TDM (or FDM) and SDM are used, and may receive data by sequentially and cyclically mapping TCI states to both CDM groups and time resources (or frequency resources).

In relation to the above methods (e.g., Methods 1-1 to 1-5), the base station needs to indicate to the UE a multiplexing scheme (e.g., TDM/FDM/SDM) (i.e., repetition scheme) used for M-TRP URLLC transmission via RRC/MAC_CE/DCI signaling. For example, the base station may indicate to the UE either TDM, FDM, or SDM via RRC/MAC_CE/DCI signaling. A TCI mapping rule between TCI states and a resource domain may be determined depending on the indicated multiplexing scheme. That is, it is possible to determine how to map N TCI states to which resources.

For example, the base station may indicate to the UE a combination of two or more of the TDM, FDM, and SDM schemes via RRC/MAC_CE/DCI signaling. If a combination of two or more of the TDM, FDM, and SDM schemes is indicated, two or more resource domains may be used for M-TRP URLLC transmission, and therefore there is a need to determine which resource domain TCI states will be mapped to first (i.e., mapping order). Unless the mapping order is determined, there may be a difference between a TCI mapping scheme applied by the base station and a TCI mapping scheme applied by the UE, and accordingly the UE may not be able to receive data.

For example, the mapping order may be predetermined between the base station and the UE. As an example, the base station and the UE may agree to sequentially and cyclically map TCI states in order of spatial resources (e.g., DMRS ports (or layers)), frequency resources (e.g., RB sets), and time resources (e.g., slots (or OFDM symbols).

In relation to the above-describe methods (e.g., Methods 1-1 to 1-5), when the base station indicates TCI states through a TCI field, it may indicate to the UE a TCI state and a resource domain (e.g., frequency resource/time resource/spatial resource) to which each TCI is to be applied, by pairing them together. For example, TCI states 0 and 1 may be indicated to be cyclically mapped to spatial resources (e.g., layers or DMRS ports) based on SDM, and TCI states 2 and 3 may be indicated to be cyclically mapped to time resources (e.g., slots, symbols, or symbol groups) based on TDM. Alternatively, all of TCI states 0, 1, 2, and 3 may be indicated to be cyclically mapped to time resources (e.g., slots, symbols, or symbol groups) based on TDM.

Through the above methods of Proposal 1, TCI mapping between TCI states and a resource domain (e.g., layers/frequency resources/time resources) may be performed in consideration of an SDM, FDM, or TDM multiplexing scheme (e.g., repetition scheme).

<Proposal 2>

Proposal 2 of the present disclosure proposes a method of mapping TCI states in consideration of a threshold-sched-offset with respect to TDM-based M-TRP URLLC transmission—that is, a TCI mapping rule.

The threshold-sched-offset may refer to a minimum time (symbol) required for a UE to receive DCI (or PDCCH for DCI transmission) and apply QCL information contained in the DCI for a PDSCH scheduled by the DCI, and may correspond to a higher layer parameter 'timeDuration-ForQCL'.

In a Rel-15 NR system, the UE may report a threshold-sched-offset to the base station through UE capability in consideration of DCI decoding time. Also, for FR2, if data is scheduled within a time duration from the receipt time of DCI to the threshold-sched-offset, the UE may receive data by using a TCI state configured for a CORESET with the lowest coreset ID. In other words, the UE may assume a QCL relationship between a DMRS port of the PDSCH and the QCL RS of the CORESET, by using a QCL parameter of the CORESET associated with the lowest coreset ID.

FIG. 10 shows a diagrammatic example of a TDM-based M-TRP URLLC transmission in which four slots are aggregated.

In FIG. 10, it is assumed that TB 0 is repeatedly transmitted in four slots using different TCI states (i.e., different TRPs/panels) (e.g., TCI states {0, 1, 2, 3}), for which a UE is scheduled through DCI. Referring to FIG. 10, transmitted data (e.g., TB 0) is all transmitted after a time duration corresponding to a threshold-sched-offset. Thus, the UE may sequentially and cyclically map TCI states {0, 1, 2, 3} indicated by the DCI to each slot.

TCI mapping methods (e.g., Method 2-1 or 2-2) applicable when data (or TB) is transmitted within the threshold-sched-offset as opposed to FIG. 10 may be considered. In FIGS. 11 to 13, too, it is assumed that TB 0 is repeatedly transmitted in four slots using different TCI states (i.e., different TRPs/panels) (e.g., TCI states {0, 1, 2, 3}), for which a UE is scheduled through DCI.

Method 2-1)

FIG. 11 shows an example of a TCI mapping rule (method) that considers a threshold-sched-offset. FIG. 11 is only an example for convenience of explanation, and the technical scope of the present disclosure is not limited to this.

Referring to FIG. 11, the first TB 0 of transmitted data is transmitted within a time duration corresponding to a threshold-sched-offset. Accordingly, a UE may receive first TB 0 data by using a TCI state configured for a coreset with the lowest coreset ID. As for the remaining TB 0 data (i.e., second/third/fourth TB 0 data), the UE may receive data by sequentially and cyclically mapping TCI states {0, 1, 2, 3} indicated (by the base station), from TCI state 0.

That is, the UE may receive data by sequentially and cyclically mapping TCI states to the remaining TBs, from TCI state 0, apart from the TBs transmitted within the time duration corresponding to the threshold-sched-offset, among the repeatedly transmitted TBs. Through this method, the base station and the UE may share the same TCI mapping scheme, and as a result, the UE may perform data decoding by using the right TCI states.

Method 2-2)

FIG. 12 shows another example of a TCI mapping rule (method) that considers a threshold-sched-offset. FIG. 12 is only an example for convenience of explanation, and the technical scope of the present disclosure is not limited to this.

Referring to FIG. 12, the first TB 0 of transmitted data is transmitted within a time duration corresponding to a threshold-sched-offset. Accordingly, a UE may receive first TB 0 data by using a TCI state configured for a coreset with the lowest coreset ID. As for the remaining TB 0 data (i.e., second/third/fourth TB 0 data), the UE may receive data by sequentially and cyclically mapping TCI states {0, 1, 2, 3} indicated (by the base station), from TCI state 1, i.e., the second TCI state.

That is, mapping of TCI states is applied regardless of the threshold-sched-offset (i.e., i-th TB is mapped to i-th TCI state), and then the TCI state of a TB transmitted within a time duration corresponding to the threshold-sched-offset is replaced with the TCI state configured for the coreset with the lowest coreset ID. As for the remaining TBs, the i-th TB may be mapped to the i-th TCI state as it is without replacement. Through this method, the base station and the UE may share the same TCI mapping scheme, and as a result, the UE may perform data decoding by using the right TCI states.

Method 2-3)

Moreover, the above TCI mapping rules (schemes) (e.g., Methods 2-1/2-2) have been described with respect to TDM-based URLLC for convenience of explanation, the above proposed TCI mapping rules (schemes) also may be applied to a combination of a SDM or FDM scheme and a TDM scheme.

For example, both the SDM scheme and the TDM scheme may be applied. In the examples to be described below, it may be assumed that TB 0 is transmitted in each slot through two layer groups (e.g., layer group 0 and layer group 1) and TB 0 is repeatedly transmitted in four slots. Also, it is assumed that TCI states {0, 1, 2, 3} are indicated.

In the example of FIG. 10, both the SDM scheme and the TDM scheme may be applied. Layer group 0 of the first TB 0 (1st TB 0) to be transmitted is mapped to TCI state 0 (i.e., indicated first TCI state), and layer group 1 may be mapped to TCI state 1 (i.e., indicated second TCI state). Also, layer groups 0 and 1 of 2nd TB 0 may be mapped to TCI states 2 and 3, respectively. Next, layer groups 0 and 1 of 3rd TB 0 and layer groups 0 and 1 of 4th TB 0, which are to be transmitted afterwards, may be cyclically mapped, starting from TCI state 0.

In the example (Method 2-1) of FIG. 11, both the SDM scheme and the TDM scheme may be applied. The first TB 0 (1st TB 0) to be transmitted may be mapped to a TCI state corresponding to a CORESET with the lowest CORESET ID, and the remaining TBs and layer groups may be cyclically mapped, sequentially from the indicated first TCI state (TCI state 0). That is, layer group 0 of the second TB 0 (2nd TB 0) to be transmitted may be mapped to TCI state 0 (i.e., indicated first TCI sate), and layer group 1 may be mapped to TCI state 1 (i.e., indicated second TCI state). Also, layer groups 0 and 1 of 3rd TB 0 may be mapped to TCI states 2 and 3, respectively. Next, layer groups 0 and 1 of 4th TB 0, which are to be transmitted afterwards, may be cyclically mapped, starting from TCI state 0.

In the example (Method 2-2) of FIG. 12, both the SDM scheme and the TDM scheme may be applied. The first TB 0 (1st TB 0) to be transmitted may be mapped to a TCI state corresponding to a CORESET with the lowest CORESET ID. TCI states 0 and 1 mapped to 1st TB 0 are replaced with the TCI state corresponding to the CORESET with the lowest CORESET ID. The remaining TBs and layer groups may be cyclically mapped, sequentially from the indicated third TCI state, as in the above-described method.

Method 2-4)

It proposes a TCI mapping rule (scheme) that may be applicable when some OFDM symbols of repeatedly transmitted data (or TBs) exist only within a time duration of a threshold-sched-offset and the remaining OFDM symbols exist beyond the time duration.

FIG. 13 shows an example of TCI mapping when a first TB is transmitted over a time duration of a threshold-sched-offset. FIG. 13 is only an example for convenience of explanation, and the technical scope of the present disclosure is not limited to this.

For example, referring to FIG. 13, a TCI state corresponding to a CORESET with the lowest CORESET ID may be mapped to a data OFDM symbol present within a time duration of the first transmitted TB (e.g., TB 0), and a TCI state indicated for the corresponding TB by the base station through the TCI field of DCI may be mapped to the remaining symbols (i.e., symbols beyond the time duration). By the above operation, the success rate of decoding data, even if only partially, present beyond the time duration may be increased by using a TCI dynamically indicated by the base station.

For another example, considering the complexity of the method of implementation of the above method, if part of OFDM symbols of data (corresponding to the threshold-sched-offset) are transmitted within the time duration, a TCI state corresponding to the CORESET with the lowest CORESET ID may be used in all of the OFDM symbols of the corresponding data.

In the above method 2-4, TBs transmitted/received after the time duration corresponding to the threshold-sched-offset may be mapped to TCI states based on the above-described methods 2-1 to 2-3.

Method 2-5)

If any one of repeatedly transmitted data (or TBs) is transmitted within a time duration (corresponding to the threshold-sched-offset), the entire repeatedly transmitted data (or TBs) may be mapped to a TCI state corresponding to the lowest CORESET, without being mapped to a TCI state indicated through a TCI field of DCI. That is, the UE may decode all repeatedly transmitted TBs by using a default TCI state (i.e., a TCI state corresponding to a CORESET with the lowest CORESET ID). By this, if any PDSCH is transmitted within the time duration, the UE may fall back to a single TCI state (i.e., single TRP) operation.

Method 2-6)

The proposed TCI mapping rules (schemes) (e.g., Methods 2-1 to 2-5) have been explained assuming that scheduling of URLLC transmission is indicated through a single DCI for convenience of explanation. In contrast, in the case of multiple DCIs, scheduling information of TBs repeatedly transmitted by each TRP through DCI transmission for each TRP may be indicated to the UE. As a result, DCI transmission time and data (or TBs) transmission time may differ for each TRP. Also, whether data is transmitted within a time duration corresponding to a threshold-sched-offset or not and the number of TBs to be transmitted within the time duration may differ for each TRP.

For example, while data (or TBs) repeatedly transmitted by TRP 1 is transmitted beyond the time duration, some of data repeatedly transmitted by TRP 2 may be transmitted within the time duration. In this case, a default TCI state for data transmitted within the time duration may be (additionally) set differently for each TRP. That is, each TRP transmits DCI through a CORESET belonging to a different CORESET group. The default TCI state of data transmitted within the time duration corresponding to the threshold-sched-offset may be determined as a TCI state of the lowest CORESET ID in the CORESET group of the CORESET in which the DCI by which the data is scheduled is transmitted. As a result, the two TRPs may be configured with different default TCI states, and therefore the default TCI state for each TRP may be optimized.

The above-described methods of Proposal 2 (e.g., Methods 2-1 to 2-6) may be applied individually or in combination depending on the situation.

FIG. 14 shows signaling in which a UE receives a single DCI (i.e., one TRP transmits a DCI to the UE) when there are M-TRPs (or M-cells; hereinafter, all TRPs can be replaced with cells, or it may be assumed that there are M-TRPs also when a plurality of CORESETs(/CORESET groups) from one TRP are configured). In FIG. 14, it is assumed that TRP 1 is a representative TRP that transmits DCI. However, this assumption does not limit the technical scope of the present disclosure.

Although the following description will be given with respect to "TRP", "TRP" may be replaced with other expressions such as a panel, an antenna array, a cell (e.g., macro cell/small cell/pico cell), a TP (transmission point), and a base station (gNB). Also, as described above, the TRPs may be divided according to information (e.g., index, ID) on a CORESET group (or CORESET pool). For example, if one UE is configured to perform transmission and reception to and from multiple TRPs (or cells), this may mean that multiple CORESET groups (or CORESET pools) are configured for one UE. Such a configuration for CORESET groups (or CORESET pools) may be performed through higher layer signaling (e.g., RRC signaling).

The UE may receive configuration information related to multiple TRP-based transmission and reception through/using TRP 1 (and/or TRP 2) from a network side (S1405). That is, the network side may transmit configuration information related to multiple TRP transmission and reception to the UE through/using TRP 1 (and/or TRP 2) (S1405). The configuration information may include information related to the configuration of the network side (i.e., TRP configuration), resource information related to multiple TRP-based transmission and reception (resource allocation), and so on. The configuration information may be delivered through higher-layer signaling (e.g., RRC signaling, MAC-CE, etc.). Also, if the configuration information is predefined or preset, the corresponding step may be omitted. For example, the configuration information may include information related to the repetition scheme (e.g., SDM scheme, FDM scheme, or TDM scheme) as explained in the above proposed methods (e.g., Proposal 1/Proposal 2). For example, one of the SDM, FDM, and TDM schemes may be indicated based on the configuration information. For another example, a combination of two or more of the SDM, FDM, and TDM schemes may be indicated based on the configuration information.

For example, in the above step S1405, an operation in which the UE (100/200 of FIGS. 17 to 21) receives configuration information related to the multiple TRP-based transmission and reception from the network side (100/200 of FIGS. 17 to 21) may be implemented by an apparatus of FIGS. 17 to 21 to be described below. For example, referring to FIG. 18, one or more processors 102 may control one or more transceivers 106 and/or one or more memories 104 to receive the configuration information related to the multiple TRP-based transmission and reception, and one or more transceivers 106 may receive the configuration information related to the multiple TRP-based transmission and reception from the network side.

Similarly, in the above step S1405, an operation in which the network side (100/200 of FIGS. 17 to 21) transmits configuration information related to the multiple TRP-based transmission and reception to the UE (100/200 of FIGS. 17 to 21) may be implemented by an apparatus of FIGS. 17 to 21 to be described below. For example, referring to FIG. 18, one or more processors 102 may control one or more transceivers 106 and/or one or more memories 104 to transmit the configuration information related to the multiple TRP-based transmission and reception, and the configuration information related to the multiple TRP-based transmission and reception is transmitted, by one or more transceivers 106, from the network side.

The UE may receive DCI and Data 1 scheduled by the DCI through/using TRP 1 from the network side (S1410-1). In addition, the UE may receive Data 2 through/using TRP 2 from the network side (S1410-2). That is, the network side may transmit DCI and Data 1 scheduled by the DCI to the UE through/using TRP 1 (S1410-1). In addition, the network side may transmit Data 2 to the UE through/using TRP 2 (S1410-2). Here, the DCI may be configured to be used for scheduling of both Data 1 and Data 2. For example, DCI and Data (e.g., Data 1, Data 2) may be transmitted through a control channel (e.g., PDCCH, etc.) and a data channel (e.g., PDSCH, etc.), respectively. In addition, the steps S1410-1 and S1410-2 may be performed simultaneously, or one of them may be performed earlier than the other steps.

The DCI may be transmitted through a control channel (e.g., PDCCH). The DCI may include i) a transmission configuration indication (TCI) field and ii) an antenna port field.

For example, a TCI state may be indicated based on the TCI field. For example, multiple TCI states may be indicated based on the TCI field. For example, each TCI state may include QCL type and QCL RS information. For example, an DM-RS (demodulation reference signal) port may be indicated based on the antenna port field.

For example, the DCI may include a CRC (cyclic redundancy check) scrambled by a specific RNTI (radio network temporary identifier). For example, the specific RNTI may be an MCS-R-RNTI (modulation coding scheme cell RNTI).

For example, in the above steps S1410-1/S1410-2, an operation in which the UE (100/200 of FIGS. 17 to 21) receives the DCI and/or the Data 1 and/or the Data 2 from the network side (100/200 of FIGS. 17 to 21) may be implemented by an apparatus of FIGS. 17 to 21 to be described below. For example, referring to FIG. 18, one or more processors 102 may control one or more transceivers 106 and/or one or more memories 104 to receive the DCI and/or the Data 1 and/or the Data 2, and one or more transceivers 106 may receive the DCI and/or the Data 1 and/or the Data 2 from the network side.

Similarly, in the above steps S1410-1/S1410-2, an operation in which the network side (100/200 of FIGS. 17 to 21) transmits the DCI and/or the Data 1 and/or the Data 2 to the UE (100/200 of FIGS. 17 to 21) may be implemented by an apparatus of FIGS. 17 to 21 to be described below. For example, referring to FIG. 18, one or more processors 102 may control one or more transceivers 106 and/or one or more memories 104 to transmit the DCI and/or the Data 1 and/or the Data 2, and one or more transceivers 106 may transmit the DCI and/or the Data 1 and/or the Data 2 to the UE.

The UE may decode the Data 1 and Data 2 received from TRP 1 and TRP 2 (S1415). For example, the UE may decode the Data 1/the Data 2 based on the above proposed method (e.g., Proposal 1 or 2).

For example, the Data (e.g., Data 1, Data 2) may be received by repeating the same transport block. For example, a repetition scheme of the Data (e.g., Data 1, Data 2) may be determined based on the above methods (e.g., Methods 1-1 to 1-5) of Proposal 1.

The repetition scheme of the Data (e.g., Data 1, Data 2) may be determined based on at least either the DCI or the configuration information. For example, the repetition scheme of the Data may be determined based on the number of CDM (Code Division Multiplexing) groups including a DM-RS port through which the Data is transmitted/received. That is, the Data may be transmitted/received through a DM-RS port or by being mapped to the DM-RS port, and the repetition scheme may be determined based on the number of CDM groups corresponding to the DM-RS port. For example, based on that the DM-RS port through which the data is transmitted/received is associated with one CDM group, the repetition scheme may be determined as either i) a scheme based on frequency resource division (i.e., FDM scheme) or ii) a scheme based on time resource division (i.e., TDM scheme). For example, the repetition scheme of the Data may be determined based on the number of CDM groups including a DM-RS port through which the Data is transmitted/received and configuration information through higher-layer signaling.

TCI states indicated through the TCI field of DCI may be mapped to a resource (e.g., time resource/frequency resource/spatial resource) for data transmission, in consideration of the repetition scheme. The UE may estimate a channel from a DMRS by using a QCL type and QCL RS indicated by a TCI state mapped to each resource, and may receive and demodulate the Data through the estimated channel.

For example, in the above step S1415, an operation in which the UE (100/200 of FIGS. 17 to 21) decodes the Data 1 and/or the Data 2 may be implemented by an apparatus of FIGS. 17 to 21 to be described below. For example, referring to FIG. 18, one or more processors 102 may control one or more memories 104 to perform the operation of decoding the Data 1 and Data 2.

The UE may transmit the DCI and HARQ-ACK information (e.g., ACK information, NACK information, etc.) for the Data 1 and/or Data 2 to the network side through/using TRP 1 and/or TRP 2 over one or more PUCCH(s), based on the above proposed method (e.g., Proposal 1 or 2) (S1420-1, S1420-2). That is, the network side may receive DCI and HARQ-ACK information (e.g., ACK information, NACK information, etc.) for the Data 1 and/or Data 2 from the UE through/using TRP 1 and/or TRP 2 over one or more PUCCH(s), based on the above proposed method (e.g., Proposal 1 or 2) (S1420-1, S1420-2).

For example, the HARQ-ACK information for Data 1 and/or Data 2 may be combined as one or separated from each other depending on the number of codewords. In addition, the UE may be configured to transmit only the HARQ-ACK information to a representative TRP (e.g., TRP 1), and the transmission of the HARQ-ACK information to the other TRP (e.g., TRP 2) may be omitted.

For example, in the above steps S1420-1/S1420-2, an operation in which the UE (100/200 of FIGS. 17 to 21) transmits HARQ-ACK information for the Data 1 and/or Data 2 to the network side (100/200 of FIGS. 17 to 21) over one or more PUCCHs, may be implemented by an apparatus of FIGS. 17 to 21 to be described below. For example, referring to FIG. 18, one or more processors 102 may control one or more transceivers 106 and/or one or more memories 104 to transmit the HARQ-ACK information for the Data 1 and/or Data 2 to the network side over one or more PUCCHs, and one or more transceivers 106 may transmit the HARQ-ACK information for the Data 1 and/or Data 2 to the network side over one or more PUCCHs.

Similarly, in the above steps S1420-1/S1420-2, an operation in which the network side (100/200 of FIGS. 17 to 21) receives HARQ-ACK information for the Data 1 and/or Data 2 from the UE (100/200 of FIGS. 17 to 21) over one or more PUCCHs may be implemented by an apparatus of FIGS. 17 to 21 to be described below. For example, referring to FIG. 18, one or more processors 102 may control one or more transceivers 106 and/or one or more memories 104 to receive the HARQ-ACK information for the Data 1 and/or Data 2, and one or more transceivers 106 may receive the HARQ-ACK information for the Data 1 and/or Data 2 from the UE over one or more PUCCHs.

Although the above FIG. 14 has been explained with respect to a single DCI-based M-TRP operation, it also may apply to multiple DCI-based M-TRP operation in some cases.

FIG. 15 shows an example of a flow chart of an operation in which a user equipment (UE) transmits and receives a data channel to which a method (e.g., Proposal 1 or 2) proposed in the present disclosure is applicable. The UE may be supported by multiple TRPs, and an ideal/non-ideal backhaul may be configured between the multiple TRPs. FIG. 15 is only for convenience of explanation and the scope of the present disclosure is not limited thereto. Also, some of the steps illustrated in FIG. 15 may be omitted depending on the situation and/or configuration.

Although the following description will be given with respect to "TRP", "TRP" may be replaced with other expressions such as a panel, an antenna array, a cell (e.g., macro cell/small cell/pico cell), a TP (transmission point), and a base station (gNB). Also, as described above, the TRPs may be divided according to information (e.g., index, ID) on a CORESET group (or CORESET pool). For example, if one UE is configured to perform transmission and reception to and from multiple TRPs (or cells), this may mean that multiple CORESET groups (or CORESET pools) are configured for one UE. Such a configuration for CORESET groups (or CORESET pools) may be performed through higher-layer signaling (e.g., RRC signaling).

The UE may receive configuration information (S1510). The configuration information may be received through higher-layer signaling (e.g., RRC). For example, the configuration information may include information related to a repetition scheme (e.g., an SDM scheme, an FDM scheme, or a TDM scheme). For example, one of the SDM, FDM, and TDM schemes may be indicated based on the configuration information. For another example, a combination of two or more of the SDM, FDM, and TDM schemes may be indicated based on the configuration information. In a case where the configuration information is preset, the step S1510 may be omitted.

For example, in the above step S1510, an operation in which the UE (100/200 of FIGS. 17 to 21) receives configuration information may be implemented by an apparatus of FIGS. 17 to 21 to be described below. For example, referring to FIG. 18, one or more processors 102 may control one or more transceivers 106 and/or one or more memories 104 to receive the configuration information, and one or more transceivers 106 may receive the configuration information.

The UE may receive downlink control information (DCI) (S1520). The DCI may be transmitted through a control channel (e.g., PDCCH). The DCI may include i) a transmission configuration indication (TCI) field and ii) an antenna port field. Also, the DCI may further include resource information for a data channel.

For example, a TCI state may be indicated based on the TCI field. For example, multiple TCI states may be indicated based on the TCI field. For example, each TCI state may include QCL type and QCL RS information.

For example, an DM-RS (demodulation reference signal) port may be indicated based on the antenna port field. For example, DMRS-related information (e.g., DMRS port-related information) may be predefined, and the DMRS-related information may include information of a plurality of states related to DM-RS port configuration and the number of CDM groups without data. Also, a mapping relationship between a DM-RS port and a CDM group may be predefined. A specific state/value may be indicated through the antenna port field. The UE may identify a DM-RS port configuration associated with the specific state/value and a CDM group mapped to the DM-RS port.

For example, the DCI may include a CRC (cyclic redundancy check) scrambled by a specific RNTI (radio network temporary identifier). For example, the specific RNTI may be an MCS-R-RNTI (modulation coding scheme cell RNTI).

For example, in the above step S1520, an operation in which the UE (100/200 of FIGS. 17 to 21) receives downlink control information may be implemented by an apparatus of FIGS. 17 to 21 to be described below. For example, referring to FIG. 18, one or more processors 102 may control one or more transceivers 106 and/or one or more memories 104 to receive the DCI, and one or more transceivers 106 may receive the DCI.

The UE may receive a data channel based on the DCI (S1530). For example, the data channel may be a physical downlink shared channel (PDSCH). The data channel may be scheduled based on the DCI.

For example, the same transport block (TB) may be repeatedly received through the data channel. This may be construed that the data channel is repeatedly received. For example, a repetition scheme of the data channel may be determined based on the above methods (e.g., Methods 1-1 to 1-5) of Proposal 1.

For example, the repetition scheme may be either i) spatial division multiplexing (SDM) in which the same TB is repeatedly transmitted through different spatial resources (e.g., layers, layer groups, or DMRS ports), or ii) time division multiplexing (TDM) in which the same TB is repeatedly transmitted based on different time domain resources (e.g., slots, symbols, and sub-symbols), or iii) frequency division multiplexing (FDM) in which the same TB is repeatedly transmitted based on different frequency domain resources (e.g., RBs, RB sets, or PRB (set)).

The repetition scheme of the data channel may be configured/determined based on at least either the DCI or the configuration information. For example, the repetition scheme of the data channel may be determined based on the number of code division multiplexing (CDM) groups including an DM-RS port through which the data channel is transmitted/received. That is, the data channel may be transmitted/received through a DM-RS port or by being mapped to the DM-RS port, and the repetition scheme may be determined based on the number of CDM groups corresponding to the DM-RS port. For example, the repetition scheme may be determined as an SDM scheme, based on that the DM-RS port through which the data channel is transmitted/received corresponds to (is included in) a plurality of CDM groups. Accordingly, each of multiple TCI states configured through the TCI field of DCI may correspond to different CDM group. For another example, the repetition scheme may be determined as either i) a scheme based on frequency resource division (i.e., FDM scheme) or ii) a scheme based on time resource division (i.e., TDM scheme), based on that the DM-RS port through which the data channel is transmitted/received corresponds to (is included in) one CDM group. That is, the repetition scheme may be recognized as not a scheme based on spatial resource division (i.e., SDM scheme).

For example, the repetition scheme of the data channel may be determined based on the number of CDM groups including a DM-RS port through which the data channel is transmitted/received and configuration information through higher-layer signaling. For example, if the number of CDM groups including an DM-RS port in which the data channel is transmitted/received is 1 (that is, the DM-RS port corresponds to one (same) CDM group), the UE may know that this is an FDM scheme or TDM scheme, and either the FDM scheme or the TDM scheme may be indicated. Alternatively, there may be detailed schemes for these schemes, and one of them may be indicated based on the configuration information.

TCI states indicated through the DCI field of the DCI may be mapped to a resource (e.g., time resource/frequency resource/spatial resource) for data channel transmission, in consideration of the repetition scheme. For example, the time resources may be slots, symbols, symbol groups, or sub-slots, the frequency resources may be RBs, RB sets, or PRB (sets), and the spatial resources may be layers, layer groups, or DMRS ports.

For example, if a DM-RS port included in (associated with) the same CDM group is configured through an antenna port field of the DCI, and multiple TCI states are indicated through the TCI field of the DCI, the multiple TCI states may be cyclically mapped to frequency resources or time resources in which a data channel is transmitted (a TB is repeatedly transmitted).

As a concrete example, if a slot-based TDM scheme is configured as a repetition scheme based on configuration information (i.e., a time resource is divided into slots) and a DM-RS port included in (associated with) the same CDM group is configured through an antenna port filed of DCI, multiple TCI states may be indicated through the TCI field of the DCI, and the same transport block may be repeatedly received in each slot through the data channel.

If a repetition scheme of the data channel is determined as a scheme (e.g., TDM) based on time resource division, the time resource may be divided into repetition units, and the same transport block may be repeatedly received for each of the repetition units through the data channel. TCI mapping between the transport block and the repetition units may be performed based on the above-described methods (e.g., Methods 2-1 to 2-6) of Proposal 2.

In this instance, a mapping relationship between the repetition units and the TCI states may vary depending on whether the transport block is received within a particular time duration from the reception time of DCI. The particular time duration refers to the above-described threshold-sched-offset (or timeDurationForQCL).

For example, if a first repetition unit is received within a particular time duration from the reception time of the DCI, a TCI state associated with a control resource set corresponding to the lowest ID may be mapped to the first repetition unit. Also, the multiple TCI states indicated through the TCI field of the DCI may be cyclically mapped for a repetition unit received after the particular time duration. Alternatively, the TCI state associated with the control resource set corresponding to the lowest ID may be mapped to a second repetition unit received after the particular time duration.

The UE may estimate a channel from a DMRS by using a QCL type and QCL RS indicated by a TCI state mapped to each resource, and may receive and demodulate the data channel through the estimated channel.

For example, in the above step S1530, an operation in which the UE (100/200 of FIGS. 17 to 21) receives the data channel may be implemented by an apparatus of FIGS. 17 to 21 to be described below. For example, referring to FIG. 18, one or more processors 102 may control one or more transceivers 106 and/or one or more memories 104 to receive the data channel, and one or more transceivers 106 may receive the data channel.

FIG. 16 shows an example of a flow chart of an operation in which a base station (BS) transmits and receives a data channel to which a method (e.g., Proposal 1 or 2) proposed in the present disclosure is applicable.

The base station and the UE may collectively refer to an object performing data transmission and reception. For example, the base station may be a concept including one or more transmission points (TPs) and one or more transmission and reception points (TRPs). Also, the TPs and/or TRPs may include the base station's panels, transmission and reception units, etc. Also, as described above, the TRPs may be divided according to information (e.g., index, ID) on a CORESET group (or CORESET pool). For example, if one UE is configured to perform transmission and reception to and from multiple TRPs (or cells), this may mean that multiple CORESET groups (or CORESET pools) are configured for one UE. Such a configuration for CORESET groups (or CORESET pools) may be performed through higher layer signaling (e.g., RRC signaling). FIG. 16 is only for convenience of explanation and the scope of the present disclosure is not limited thereto. Also, some of the steps illustrated in FIG. 16 may be omitted depending on the situation and/or configuration.

The base station BS may transmit configuration information to the UE (S1610). The configuration information may be transmitted through higher-layer signaling (e.g., RRC). For example, the configuration information may include information related to a repetition scheme (e.g., an SDM scheme, an FDM scheme, or a TDM scheme). For example, one of the SDM, FDM, and TDM schemes may be indicated based on the configuration information. For another example, a combination of two or more of the SDM, FDM, and TDM schemes may be indicated based on the configuration information. In a case where the configuration information is preset, the step S1610 may be omitted.

For example, in the above step S1610, an operation in which the base station (100/200 of FIGS. 17 to 21) transmits configuration information may be implemented by an apparatus of FIGS. 17 to 21 to be described below. For example, referring to FIG. 18, one or more processors 102 may control one or more transceivers 106 and/or one or more memories 104 to transmit the configuration information, and one or more transceivers 106 may transmit the configuration information.

The operation of the step S1610 may correspond to the above-described UE operation of the step S1510, so a redundant description will be omitted.

The base station BS may transmit downlink control information (DCI) to the UE (S1620). The DCI may be transmitted through a control channel (e.g., PDCCH). The DCI may include i) a transmission configuration indication (TCI) field and ii) an antenna port field.

For example, a TCI state may be indicated based on the TCI field. For example, multiple TCI states may be indicated based on the TCI field. For example, each TCI state may include QCL type and QCL RS information.

For example, an DM-RS (demodulation reference signal) port may be indicated based on the antenna port field. For example, DMRS-related information (e.g., DMRS port-related information) may be predefined, and the DMRS-related information may include information of a plurality of states related to DM-RS port configuration and the number of CDM groups without data. Also, a mapping relationship between a DM-RS port and a CDM group may be predefined. A specific state/value may be indicated through the antenna port field. The UE may identify a DM-RS port configuration associated with the specific state/value and a CDM group mapped to the DM-RS port.

The operation of the step S1620 may correspond to the above-described UE operation of the step S1520, so a redundant description will be omitted.

For example, in the above step S1620, an operation in which the base station (100/200 of FIGS. 17 to 21) transmits DCI may be implemented by an apparatus of FIGS. 17 to 21 to be described below. For example, referring to FIG. 18, one or more processors 102 may control one or more transceivers 106 and/or one or more memories 104 to transmit the DCI, and one or more transceivers 106 may transmit the DCI.

The base station may transmit a data channel to the UE (S1630). For example, the data channel may be a physical downlink shared channel (PDSCH).

For example, the base station may repeatedly transmit the same transport block (TB) through the data channel. This may be construed as repeated transmission of the data channel. For example, a repetition scheme of the data channel may be determined based on the above methods (e.g., Methods 1-1 to 1-5) of Proposal 1.

The repetition scheme of the data channel may be configured/determined based on at least either the DCI or the configuration information. For example, the repetition scheme of the data channel may be determined based on the number of code division multiplexing (CDM) groups including an DM-RS port through which the data channel is transmitted. That is, the data channel may be transmitted through a DM-RS port or by being mapped to the DM-RS port, and the repetition scheme may be determined based on the number of CDM groups corresponding to the DM-RS port. For example, the repetition scheme may be determined as an SDM scheme, based on that the DM-RS port through which the data channel is transmitted corresponds to (is associated with) a plurality of CDM groups. Accordingly, multiple TCI states configured through the TCI field of DCI may correspond to different CDM groups, respectively. For another example, the repetition scheme may be determined as either i) a scheme based on frequency resource division (i.e., FDM scheme) or ii) a scheme based on time resource division (i.e., TDM scheme), based on that the DM-RS port through which the data channel is transmitted corresponds to (is associated with) one CDM group (that is, based on that the DM-RS port is included in one CDM group).

For example, the repetition scheme of the data channel may be determined based on the number of CDM groups including a DM-RS port through which the data channel is transmitted and configuration information through higher-layer signaling.

TCI states indicated through the DCI field of the DCI may be mapped to a resource (e.g., time resource/frequency resource/spatial resource) for data channel transmission, in consideration of the repetition scheme.

For example, if the bas station configures a DM-RS port included in (associated with) the same CDM group through an antenna port field of the DCI, and indicates multiple TCI states through the TCI field of the DCI, the multiple TCI states may be cyclically mapped to frequency resources or time resources in which a data channel is transmitted (a TB is repeatedly transmitted).

As a concrete example, if the base station repeatedly transmits the same transport block by dividing a time resource into slots, a DM-RS port included in (associated with) the same CDM group through an antenna port field of DCI, as well a repetition scheme of the TDM scheme, may be configured, multiple TCI states may be indicated through the TCI field of the DCI, and the multiple TCI states may be cyclically mapped to the slots.

For example, a data channel is repeatedly transmitted based on a scheme based on time resource division (i.e., TDM scheme), the base station may repeatedly transmit the same transport block for each repetition unit of a time resource through the data channel. TCI mapping between the transport block and the repetition units may be performed based on the above-described methods (e.g., Methods 2-1 to 2-6) of Proposal 2.

The operation of the step S1630 may correspond to the above-described UE operation of the step S1530, so a redundant description will be omitted.

For example, in the above step S1630, an operation in which the base station (100/200 of FIGS. 17 to 21) transmits a data channel may be implemented by an apparatus of FIGS. 17 to 21 to be described below. For example, referring to FIG. 18, one or more processors 102 may control one or more transceivers 106 and/or one or more memories 104 to transmit the data channel, and one or more transceivers 106 may transmit the data channel.

As mentioned above, the above-described network side (base station)/UE signaling and operation (e.g., Proposal 1/Proposal 2/FIG. 14/FIG. 15/FIG. 16, etc.) may be implemented by an apparatus (e.g., FIG. 17 to FIG. 21) to be described later. For example, the network side (e.g., TRP 1/TRP 2) may correspond to a first wireless device, and the UE may correspond to a second wireless device, or vice versa in some cases. For example, the first device (e.g., TRP 1)/second device (e.g., TRP 2) may correspond to a first wireless device, and the UE may correspond to a second wireless device, or vice versa in some cases.

For example, the above-described network side (base station)/UE signaling and operation (e.g., Proposal 1/Proposal 2/FIG. 14/FIG. 15/FIG. 16, etc.) may be processed by one or more processors (e.g., 102 and 202) of FIGS. 17 to 21, and the above-described network side (base station)/UE signaling and operation (e.g., Proposal 1/Proposal 2/FIG. 14/FIG. 15/FIG. 16, etc.) may be stored in one or more memories (e.g., 104 and 204) in the form of a command/program (e.g., instruction or executable code) for running at least one processor (e.g., 102 and 202) of FIGS. 17 to 21.

Communication System Applied to the Disclosure

The various descriptions, functions, procedures, proposals, methods, and/or operational flowcharts of the disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 17 illustrates a communication system applied to the disclosure.

Referring to FIG. 17, a communication system applied to the disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/ radio/5G devices. The wireless devices may include, without being limited to, a robot 1010a, vehicles 1010b-1 and 1010b-2, an eXtended Reality (XR) device 1010c, a hand-held device 1010d, a home appliance 1010e, an Internet of Things (IoT) device 1010f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 1010a to 1010f may be connected to the network 300 via the BSs 1020. An AI technology may be applied to the wireless devices 1010a to 1010f and the wireless devices 1010a to 1010f may be connected to the AI server 400 via the network 300. The network 300 may be configured using a 3G network, a 4G (e.g., LTE) network, or a 5G (e.g., NR) network. Although the wireless devices 1010a to 1010f may communicate with each other through the BSs 1020/network 300, the wireless devices 1010a to 1010f may perform direct communication (e.g., sidelink communication) with each other without passing through the BSs/network. For example, the vehicles 1010b-1 and 1010b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 1010a to 1010f.

Wireless communication/connections 150a, 150b, or 150c may be established between the wireless devices 1010a to 1010f/BS 1020, or BS 1020/BS 1020. Herein, the wireless communication/connections may be established through various RATs (e.g., 5G NR) such as uplink/downlink communication 150a, sidelink communication 150b (or, D2D communication), or inter BS communication (e.g. Relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the disclosure.

Devices Applicable to the Disclosure

FIG. 18 illustrates wireless devices applicable to the disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 1010x and the BS 1020} and/or {the wireless device 1010x and the wireless device 1010x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the disclosure, the wireless device may represent a communication modem/circuit/chip.

The second wireless device 200 may include at least one processor 202 and at least one memory 204 and additionally further include at least one transceiver 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage medium, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. Using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Signal Processing Circuit Example to which Disclosure is Applied

FIG. 19 illustrates a signal processing circuit for a transmit signal.

Referring to FIG. 19, a signal processing circuit 1000 may include a scrambler 1010, a modulator 1020, a layer mapper 1030, a precoder 1040, a resource mapper 1050, and a signal generator 1060. Although not limited thereto, an operation/function of FIG. 19 may be performed by the processors 102 and 202 and/or the transceivers 106 and 206 of FIG. 18. Hardware elements of FIG. 19 may be implemented in the processors 102 and 202 and/or the transceivers 106 and 206 of FIG. 18. For example, blocks 1010 to 1060 may be implemented in the processors 102 and 202 of FIG. 18. Further, blocks 1010 to 1050 may be implemented in the processors 102 and 202 of FIG. 18 and the block 1060 of FIG. 18 and the block 2060 may be implemented in the transceivers 106 and 206 of FIG. 18.

A codeword may be transformed into a radio signal via the signal processing circuit 1000 of FIG. 19. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 1010. A scramble sequence used for scrambling may be generated based on an initialization value and the initialization value may include ID information of a wireless device. The scrambled bit sequence may be modulated into a modulated symbol sequence by the modulator 1020. A modulation scheme may include pi/2-BPSK (pi/2-Binary Phase Shift Keying), m-PSK (m-Phase Shift Keying), m-QAM (m-Quadrature Amplitude Modulation), etc. A complex modulated symbol sequence may be mapped to one or more transport layers by the layer mapper 1030. Modulated symbols of each transport layer may be mapped to a corresponding antenna port(s) by the precoder 1040 (precoding). Output z of the precoder 1040 may be obtained by multiplying output y of the layer mapper 1030 by precoding matrix W of N*M. Here, N represents the number of antenna ports and M represents the number of transport layers. Here, the precoder 1040 may perform precoding after performing transform precoding (e.g., DFT transform) for complex modulated symbols. Further, the precoder 1040 may perform the precoding without performing the transform precoding.

The resource mapper 1050 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 1060 may generate the radio signal from the mapped modulated symbols and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like.

A signal processing process for a receive signal in the wireless device may be configured in the reverse of the signal processing process (1010 to 1060) of FIG. 19. For example, the wireless device (e.g., 100 or 200 of FIG. 18) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource de-mapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Example of a Wireless Device Applied to the Disclosure

FIG. 20 illustrates another example of a wireless device applied to the disclosure. The wireless device may be implemented in various forms according to a use-case/service (refer to FIG. 17).

Referring to FIG. 20, wireless devices 1010 and 1020 may correspond to the wireless devices 100 and 200 of FIG. 18 and may be configured by various elements, components, units/portions, and/or modules. For example, each of the wireless devices 1010 and 2010 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 104 of FIG. 18. For example, the transceiver(s) 114 may include the one or more transceivers 106 and 106 and/or the one or more antennas 108 and 108 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110).

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (1010*a* of FIG. 17), the vehicles (1010*b*-1 and 1010*b*-2 of FIG. 17), the XR device (1010*c* of FIG. 17), the hand-held device (1010*d* of FIG. 17), the home appliance (1010*e* of FIG. 17), the IoT device (1010*f* of FIG. 17), a digital broadcast terminal, a hologram device, a public safety device, an MTC device, a medicine device, a fintech device (or a finance device), a security device, a climate/environment device, the AI server/device (400 of FIG. 17), the BSs (1020 of FIG. 17), a network node, etc. The wireless device may be used in a mobile or fixed place according to a use-example/service.

In FIG. 18, the entirety of the various elements, components, units/portions, and/or modules in the wireless devices 100 and 100 may be connected to each other through a wired interface or at least a part thereof may be wirelessly connected through the communication unit 110. For example, in each of the wireless devices 100 and 100, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 100 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Portable Device Example to which Disclosure is Applied

FIG. 21 illustrates a portable device applied to the disclosure. The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 21, a portable device 1010 may include an antenna unit 108, a communication unit 110, a control unit 120, a memory unit 130, a power supply unit 140*a*, an interface unit 140*b*, and an input/output unit 140*c*. The antenna unit 108 may be configured as a part of the communication unit 110. The blocks 110 to 130/140*a* to 140*c* correspond to the blocks 110 to 130/140 of FIG. 20, respectively.

The communication unit 110 may transmit/receive a signal (e.g., data, a control signal, etc.) to/from another wireless device and eNBs. The control unit 120 may perform various operations by controlling components of the portable device 1010. The control unit 120 may include an Application Processor (AP). The memory unit 130 may store data/parameters/programs/codes/instructions required for driving the portable device 1010. Further, the memory unit 130 may store input/output data/information, etc. The power supply unit 140*a* may supply power to the portable device 1010 and include a wired/wireless charging circuit, a battery, and the like. The interface unit 140*b* may support a connection between the portable device 1010 and another external device. The interface unit 140*b* may include various ports (e.g., an audio input/output port, a video input/output port) for the connection with the external device. The input/output unit 140*c* may receive or output a video information/signal, an audio information/signal, data, and/or information input from a user. The input/output unit 140*c* may include a camera, a microphone, a user input unit, a display unit 140*d*, a speaker, and/or a haptic module.

As one example, in the case of data communication, the input/output unit 140*c* may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140*c*.

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and may implement embodiments of the disclosure. The order of operations described in embodiments of the disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the disclosure may be implemented by various means, for example, hardware, firmware, software, or combinations thereof. When embodiments are implemented by hardware, one embodiment of the disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the disclosure may be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

INDUSTRIAL AVAILABILITY

Although the method of transmitting and receiving data channel in the wireless communication system of the present disclosure has been described in connection with examples in which it applies to 3GPP LTE/LTE-A system and 5G systems (new RAT systems), the method is also applicable to other various wireless communication systems.

The invention claimed is:

1. A method performed by a user equipment (UE) in a wireless communication system, the method comprising:
receiving configuration for one of a plurality of multiplexing schemes related to single downlink control information (DCI) based Multiple-Transmission and Reception Point (multi-TRP) operation;
receiving the DCI including i) a transmission configuration indication (TCI) field and ii) an antenna port field; and
receiving a shared channel based on the DCI,
wherein multiple TCI states are indicated based on the TCI field, and one or more demodulation reference signal (DM-RS) ports are indicated based on the antenna port field,
wherein a multiplexing scheme is determined based on a number of one or more code division multiplexing (CDM) groups related to the one or more DM-RS ports,
wherein, based on the number of the one or more CDM groups being two, the multiplexing scheme is determined as a Spatial Division Multiplexing (SDM) scheme, and
wherein, based on i) the configuration and ii) the number of the one or more CDM groups being one, the multiplexing scheme is determined as a Frequency Division Multiplexing (FDM) scheme or a Time Division Multiplexing (TDM) scheme.

2. The method of claim 1, wherein, based on that the one or more DM-RS ports are related to a plurality of CDM groups, a CDM group related to one of the multiple TCI states is different from a CDM group related to another one of the multiple TCI states.

3. The method of claim 1, wherein the multiple TCI states are cyclically mapped to a frequency resource related to the FDM or a time resource related to the TDM.

4. The method of claim 3, wherein, based on that (i) the time resource is divided into slots and the (ii) a same transport block is repeatedly received in each slot through the shared channel, the multiple TCI states are cyclically mapped to the slots.

5. The method of claim 3, wherein, the multiplexing scheme is determined as the TDM scheme, the time resource is divided into repetition units, and a same transport block is repeatedly received for each of the repetition units through the shared channel.

6. The method of claim 5, wherein, based on that a first repetition unit is received within a particular time duration from the reception time of the DCI, a TCI state associated with a control resource set with a lowest ID is mapped to the first repetition unit.

7. The method of claim 6, wherein the multiple TCI states are cyclically mapped for a repetition unit received after the particular time duration.

8. The method of claim 6, wherein a second repetition unit received after the particular time duration and the TCI state associated with the control resource set are mapped to each other.

9. A user equipment (UE) configured to operate in a wireless communication system, the UE comprising:
one or more transceivers;
one or more processors; and
one or more memories connected to the one or more processors and storing instructions that, when executed by the one or more processors, configure the one or more processors to perform operations comprising:
receiving configuration for one of a plurality of multiplexing schemes related to single downlink control information (DCI) based Multiple-Transmission and Reception Point (multi-TRP) operation;
receiving the DCI including i) a transmission configuration indication (TCI) field and ii) an antenna port field; and
receiving a shared channel based on the DCI,
wherein multiple TCI states are indicated based on the TCI field, and one or more demodulation reference signal (DM-RS) ports are indicated based on the antenna port field,
wherein a multiplexing scheme is determined based on a number of one or more code division multiplexing (CDM) groups related to the one or more DM-RS ports,
wherein, based on the number of the one or more CDM groups being two, the multiplexing scheme is determined as a Spatial Division Multiplexing (SDM) scheme, and
wherein, based on i) the configuration and ii) the number of the one or more CDM groups being one, the multiplexing scheme is determined as a Frequency Division Multiplexing (FDM) scheme or a Time Division Multiplexing (TDM) scheme.

10. A base station configured to operate in a wireless communication system, the base station comprising:
one or more transceivers;
one or more processors; and
one or more memories connected to the one or more processors and storing instructions that, when executed by the one or more processors, configure the one or more processors to perform operations comprising:
transmitting configuration for one of a plurality of multiplexing schemes related to single downlink control information (DCI) based Multiple-Transmission and Reception Point (multi-TRP) operation;
transmitting the DCI including i) a transmission configuration indication (TCI) field and ii) an antenna port field; and
transmitting a shared channel based on the DCI,
wherein multiple TCI states are indicated based on the TCI field, and one or more demodulation reference signal (DM-RS) ports are indicated based on the antenna port field,
wherein a multiplexing scheme is determined based on a number of one or more code division multiplexing (CDM) groups related to the one or more DM-RS ports,
wherein, based on the number of the one or more CDM groups being two, the multiplexing scheme is determined as a Spatial Division Multiplexing (SDM) scheme, and
wherein, based on i) the configuration and ii) the number of the one or more CDM groups being one, the multiplexing scheme is determined as a Frequency Division Multiplexing (FDM) scheme or a Time Division Multiplexing (TDM) scheme.

11. The base station of claim 10, wherein the multiple TCI states are cyclically mapped to a frequency resource related to the FDM or a time resource related to the TDM.

12. The base station of claim 11, wherein, based on that (i) the time resource is divided into slots and (ii) a same transport block is repeatedly received in each slot through the shared channel, the multiple TCI states are cyclically mapped to the slots.

* * * * *